United States Patent
Claes

(10) Patent No.: US 8,372,913 B2
(45) Date of Patent: Feb. 12, 2013

(54) RADIATION CURABLE INKJET PRINTING METHODS

(75) Inventor: Roland Claes, Dendermonde (BE)

(73) Assignee: Agfa Graphics NV, Mortsel (BG)

( * ) Notice: Subject to any disclaimer, the term of this patent is extended or adjusted under 35 U.S.C. 154(b) by 0 days.

(21) Appl. No.: 13/313,141

(22) Filed: Dec. 7, 2011

(65) Prior Publication Data

US 2012/0108746 A1     May 3, 2012

Related U.S. Application Data

(62) Division of application No. 12/738,982, filed as application No. PCT/EP2008/063830 on Oct. 15, 2008, now Pat. No. 8,133,551.

(60) Provisional application No. 60/982,475, filed on Oct. 25, 2007.

(30) Foreign Application Priority Data

Oct. 24, 2007 (EP) ..................................... 07119177

(51) Int. Cl.
     *C09D 11/10*      (2006.01)
     *C09D 4/02*      (2006.01)

(52) U.S. Cl. ........................... 524/853; 523/160; 347/96

(58) Field of Classification Search .................. 427/511, 427/532
See application file for complete search history.

(56) References Cited

U.S. PATENT DOCUMENTS 6,310,115 B1 * 10/2001 Vanmaele et al. ............... 522/25
2006/0092254 A1 * 5/2006 Claes et al. .................... 347/102

OTHER PUBLICATIONS

Claes; "Radiation Curable Inkjet Printing Methods"; U.S. Appl. No. 12/738,982, filed Apr. 21, 2010.

* cited by examiner

*Primary Examiner* — Vu A Nguyen
(74) *Attorney, Agent, or Firm* — Keating & Bennett, LLP

(57) ABSTRACT

An inkjet printing method includes the steps of a) providing a first radiation curable composition curable by free radical polymerization or cationic polymerization; b) applying a layer of the first radiation curable composition on a substrate; c) curing the layer; d) jetting on the cured layer a second composition curable by a different polymerization than the first composition but selected from the group consisting of free radical polymerization and cationic polymerization; and e) curing the jetted second composition by a different polymerization than the first composition. The first composition includes a cationically polymerizable compound having at least one (meth)acrylate group present in the first curable composition in an amount of at least 25 wt % based upon the total weight of the first curable composition. An inkjet ink set may be used in the above inkjet printing method.

9 Claims, No Drawings

RADIATION CURABLE INKJET PRINTING METHODS

CROSS-REFERENCE TO RELATED APPLICATIONS

This application is a 371 National Stage Application of PCT/EP2008/063830, filed Oct. 15, 2008. This application claims the benefit of U.S. Provisional Application No. 60/982,475, filed Oct. 25, 2007, which is incorporated by reference herein in its entirety. In addition, this application claims the benefit of European Application No. 07119177.9, filed Oct. 24, 2007, which is also incorporated by reference herein in its entirety.

BACKGROUND OF THE INVENTION

1. Field of the Invention

This invention relates to radiation curable inkjet ink sets and their use in inkjet printing methods.

2. Description of the Related Art

In inkjet printing, tiny drops of ink fluid are projected directly onto an ink-receiver surface without physical contact between the printing device and the ink-receiver. The printing device stores the printing data electronically and controls a mechanism for ejecting the drops image-wise. Printing is accomplished by moving a print head across the ink-receiver or vice versa or both.

When jetting the inkjet ink onto an ink-receiver, the ink typically includes a liquid vehicle and one or more solids, such as dyes or pigments and polymers. Ink compositions can be roughly divided in:

water-based, the drying mechanism involving absorption, penetration and evaporation;
solvent-based, the drying primarily involving evaporation;
oil-based, the drying involving absorption and penetration;
hot melt or phase change, in which the ink is liquid at the ejection temperature but solid at room temperature and wherein drying is replaced by solidification; and
UV-curable, in which drying is replaced by polymerization.

It should be clear that the first three types of ink compositions are more suitable for an absorbing ink-receiver, whereas hot melt inks and UV-curable inks can also be printed on non-absorbing ink-receivers. Due to thermal requirements posed by hot melt inks on the substrates, especially radiation curable inks have gained the interest of the industry in inkjet printing applications.

The behaviour and interaction of a UV-curable ink on a substantially non-absorbing ink-receiver was found to be quite complicated compared to water-based inks on absorbent ink-receivers. In particular, a good and controlled spreading of the ink on the ink-receiver proved to be problematic and adhesion problems were observed on using different types of non-absorbing ink-receivers.

One way to approach these problems is to develop and use different ink sets for different types of substrates, but this is a not a preferred solution since changing inks in the printer and print head is very time consuming and not really a viable solution for an industrial printing environment.

The adhesion may be influenced by using different polymerizable compounds, surfactants, binders and/or organic solvents. U.S. Pat. No. 6,814,791 (DOMINO PRINTING SCIENCES) discloses inkjet printing methods wherein the ink composition including methyl acetate as a solvent is printed upon substrates of propylene and ethylene. The use of a well-chosen solvent usually results in partial swelling or dissolution of the substrate surface which leads to better adhesion, but can also cause problems of blocked nozzles in the printhead due to evaporation of solvent. Other solvents, such as 2-butoxyethyl acetate, are disclosed by WO 2005/047405 (VUTEK).

It is known that the adhesion of radiation curable inks can also be promoted on polyvinyl chloride substrates when one or more monomers are used that are suitable for the swelling of the PVC substrate and which are selected from the group consisting of tetrahydrofurfuryl acrylate, 1,6-hexanediol diacrylate and N-vinyl caprolactam. However, adhesion on polycarbonate substrates is promoted when one or more monomers are used that are suitable for the swelling of the polycarbonate substrate and which are selected from the group consisting of propoxylated neopentyl glycol diacrylate, 2-phenoxyethyl acrylate, 2-(2-ethoxyethoxy)ethyl acrylate and polyethyleneglycol diacrylate. As a consequence one has to make the "best possible" mixture of monomers suitable for both the swelling of polyvinyl chloride substrates and polycarbonate substrates. Often such a compromise, whereby acceptable adhesion is obtained on several ink-receivers by making a complex mixture of ingredients, has a negative effect on the dispersion stability of a pigmented inkjet ink.

Adhesion problems have also been associated with shrinkage of an ink-layer after radiation curing. In this aspect, cationic inks have been regarded to be superior in comparison to free radical polymerizable inks. EP 1705229 A (FUJI) discloses cationically polymerizable inkjet inks exhibiting good adhesion and storage stability.

Specific monomers for cationic inks exhibiting improved adhesion are disclosed by US 2004166253 (KONICA MINOLTA) wherein the curable ink-jet ink includes an epoxy compound containing an alicyclic epoxy group and an epoxyfied fatty acid ester group.

U.S. Pat. No. 6,310,115 (AGFA) discloses radiation curable inkjet ink compositions including radiation curable monomers containing vinylether and acrylate functions, which can be cured both by cationic polymerization and free radical polymerization.

Instead of adapting the inkjet inks, it has become the general approach to modify the surface chemistry of the ink-receiver either by a pre-treatment such as plasma or corona treatment or by applying a suitable surface layer, a so-called primer.

Corona discharge treatment and plasma treatment increase the cost, complexity and maintenance of the equipment used to process the substrates. Substrates may contain significant impurities or irregularities that may interfere with the treatment of the substrate, and hence not result to the uniform spreading and adhesion of ink.

The other possibility is the application of a primer prior to jetting the inkjet inks. Generally, the surface layer is coated and dried or cured before jetting the inkjet ink as, for example, in the inkjet printing process in EP 1671805 A (AGFA) and US 2003021961 (3M), but it can also remain a wet, un-cured surface layer as in WO 00/30856 (XAAR).

A single composition of a surface layer suitable for all the different substrates is however not available. WO 2006/111707 (SUN CHEMICAL) discloses a process of ink jet printing in which:
i) a primer is applied to a substrate material;
ii) ink is ink jet printed onto the primed substrate;
iii) a characteristic relating to print quality is evaluated;
iv) the composition of the primer is adjusted in dependence on the evaluated characteristic relating to print quality; and v) the adjusted primer composition is applied to the substrate material and ink is ink jet printed onto the primed substrate material to give a printed product. Although it might be possible to solve all adhesion problems with this approach, the method of testing and adjusting the surface layer remains a time-consuming method and not really a viable solution for an industrial printing environment.

US 2003/199655 (NIPPON SHOKUBAI) discloses reactive diluent and curable resin compositions including vinylether acrylates.

WO 2007/048819 (HUNTSMAN) discloses low viscosity photocurable compositions for rapid prototyping techniques containing (i) a cationically curable component (ii) a free radically active component (iii) an antimony-free cationic photoinitiator and (v) a free radical photoinitiator.

Therefore, a need continues to exist for radiation curable inkjet inks that adhere well to multiple substrates. A simple and fast method for improving the adhesion is desirable.

SUMMARY OF THE INVENTION

Preferred embodiments of the present invention provide a fast and simple inkjet printing method exhibiting good adhesion on a plurality of substrates.

Other preferred embodiments of the present invention provide an inkjet ink set for obtaining improved adhesion on a plurality of substrates.

These and other preferred embodiments of the invention will become apparent from the description hereinafter.

In general one can observe three situations with regard to the adhesion of cationically and free radical polymerizable inkjet inks on a substrate:

1. Both cationically and free radical polymerizable inkjet inks adhere well to the substrate;
2. A cationically polymerizable inkjet ink adheres much better to the substrate than a free radical polymerizable inkjet ink; and
3. A free radical polymerizable inkjet ink adheres much better to the substrate than a cationically polymerizable inkjet ink.

It was surprisingly found that a cationically polymerizable compound having at least one (meth)acrylate functional group could be advantageously used in a curable primer to improve adhesion, when the curable primer was formulated to have a different polymerization mechanism than the curable inks adhering poorly to the substrate.

Preferred embodiments of the present invention are realized with an inkjet printing method as defined below.

Preferred embodiments of the present invention are also realized with an inkjet ink set as defined below.

Preferred embodiments of the present invention are also realized by the use of inkjet ink as defined below.

Further advantages and preferred embodiments of the present invention will become apparent from the following description.

DETAILED DESCRIPTION OF THE PREFERRED EMBODIMENTS

Definitions

The term "dye", as used in disclosing the present invention, means a colorant having a solubility of 10 mg/L or more in the medium in which it is applied and under the ambient conditions pertaining.

The term "pigment" is defined in DIN 55943, herein incorporated by reference, as a colorant that is practically insoluble in the application medium under the pertaining ambient conditions, hence having a solubility of less than 10 mg/L therein.

The term "C.I." is used in disclosing the present application as an abbreviation for Colour Index.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methyl-butyl etc.

The term "primer" is used in disclosing the present application as a synonym for the first curable composition.

The term "actinic radiation" as used in disclosing the present invention, means electromagnetic radiation capable of initiating photochemical reactions.

The term "ultraviolet radiation" as used in disclosing the present invention, means electromagnetic radiation in the wavelength range of 100 to 400 nanometers.

Inkjet Printing Methods

An inkjet printing method includes the steps of:
a) providing a first radiation curable composition curable by free radical polymerization or cationic polymerization;
b) applying a layer of the first radiation curable composition on a substrate;
c) curing the layer; and
d) jetting on the cured layer a second composition curable by a different polymerization than the first composition but selected from the group consisting of free radical polymerization and cationic polymerization,
characterized in that the first composition includes a cationically polymerizable compound having at least one (meth) acrylate group in an amount of at least 25 wt %, more preferably at least 30 wt % based upon the total weight of the first curable composition.

In a first preferred embodiment, radiation curable inks which are polymerized by free radical polymerization are used in combination with a cationically polymerizable primer including a compound which is polymerizable by both free radical polymerization and cationic polymerization. On substrates where the free radical polymerizable inks adhere well to the substrate or even better than cationic inks would adhere, there is no need to use the cationically polymerizable primer. However, on substrates more suitable to be printed upon with cationically radiation curable inks because they exhibit better adhering images to the substrate, the primer comes into play. The primer is applied to the substrate as a layer, for example, by coating or jetting. By exposing the radiation curable primer to actinic radiation, cationic polymerization of the compound which is polymerizable by both free radical polymerization and cationic polymerization occurs. It is believed that after curing of the primer, uncured acrylate functional groups on the surface of the cured primer crosslink with the free radical polymerizable compounds in the free radical curable ink jetted on top of the cured primer. On curing of the jetted ink, a good adhesive bond between the ink layer and the primer/substrate is obtained.

In a second preferred embodiment, radiation curable inks which are cationically polymerized are used in combination with a free radical polymerizable primer including a compound which is polymerizable by both free radical polymerization and cationic polymerization. On substrates where the cationically polymerizable inks adhere well to the substrate or even better than free radical inks would adhere, there is no need to use the free radical polymerizable primer. However, on substrates more suitable to be printed upon with free radical radiation curable inks because they exhibit better adhering images to the substrate, the primer comes into play.

The primer is applied to the substrate as a layer, for example, by coating or jetting. By exposing the radiation curable primer to actinic radiation, free radical polymerization of the compound which is polymerizable by both free radical polymerization and cationic polymerization occurs. It is believed that after curing of the primer, cationically polymerizable functional groups on the surface of the cured primer crosslink with the cationically polymerizable compounds in the curable ink jetted on top of the cured primer. On curing of the jetted ink, a good adhesive bond between the ink layer and the primer/substrate is obtained.

In a preferred embodiment, the first radiation curable composition is a clear composition, especially on opaque substrates.

In another preferred embodiment, the first radiation curable composition is a white composition, preferably containing titanium dioxide as white pigment. White primers can be advantageously used, for example, on transparent substrates to enhance the contrast and the vividness of colour inks.

The first radiation curable composition may include at least one component selected from the group consisting of a fluorescent compound, a phosphorescent compound, a thermochromic compound, an iridescent compound and a magnetic particle. This is advantageous for incorporating a security feature into the printed image without disturbing the printed image under normal viewing conditions.

The substrate for a cationically polymerizable primer or first radiation curable composition is preferably selected from the group consisting of polypropylene and polycarbonate.

The substrate for a free radical polymerizable primer or first radiation curable composition is preferably selected from the group consisting of paper, polymethylmethacrylate and polyvinylchloride.

First Radiation Curable Compositions

The first radiation curable composition or primer is a composition which can be coated or printed upon the substrate. There are no real limitations towards the coating or printing technique used to apply a layer of the first radiation curable composition.

Suitable coating techniques include dip coating, knife coating, extrusion coating, spin coating, slide hopper coating and curtain coating.

Suitable printing techniques include offset printing, flexographic printing, gravure, screen-printing and inkjet printing. In a preferred embodiment, the first radiation curable composition or primer is applied by spraying or jetting, most preferably by inkjet printing.

The dry thickness of the cured layer of the first radiation curable composition is preferably at most 20 µm, more preferably at most 15 µm and most preferably at most 10 µm. The dry thickness of the cured layer of the first radiation curable composition is preferably between 1 and 8 µm, more preferably between 2 and 6 µm.

In a preferred embodiment, the first radiation curable composition is a UV-curable composition.

In one preferred embodiment, the first radiation curable composition is prepared in-situ, i.e. in or at the inkjet printer by adding one or more photoinitiators to a composition including the compound which is polymerizable by both free radical polymerization and cationic polymerization. Methods and apparatuses for preparing a mixture in-situ in the inkjet printer are disclosed e.g. in EP 1935652 (AGFA GRAPHICS).

In another preferred embodiment, the first radiation curable composition contains at least one photo-initiator. If the first radiation curable composition is a cationically polymerizable first radiation curable composition, then the photoinitiator is one or more cationic photoinitiators, such as photo-acid generating agents. If the first radiation curable composition is a free radical polymerizable first radiation curable composition, then the photoinitiator is one or more free radical photoinitiators, i.e. Norrish Type I and/or Type II photoinitiators.

In the case of free radical polymerizable primer, the first radiation curable composition may further also contain at least one co-initiator or polymerization synergist. Frequently a tertiary amine compound is used as co-initiator. The amount of co-initiator or co-initiators is in general from 0.01 to 50 wt %, preferably from 0.05 to 25 wt %, preferably from 0.1 to 10 wt %, based in each case on the total weight of the first radiation curable composition.

The first radiation curable composition may further also contain at least one inhibitor.

The first radiation curable composition may further also contain at least one surfactant.

The first radiation curable composition preferably does not contain an evaporable component such as an organic solvent or water. But sometimes it can be advantageous to incorporate a small amount of an organic solvent in the primer to improve adhesion to the surface of the ink-receiver after UV-curing. In this case, the added solvent can be any amount in the range that does not cause problems of latency, solvent resistance and VOC-emission, and is preferably 0.1-10.0 wt %, and particularly preferably 0.1-5.0 wt %, each based on the total weight of the first radiation curable composition.

The viscosity of the first radiation curable composition is preferably smaller than 100 mPa·s at 30° C. and at a shear rate of $100 \text{ s}^{-1}$. The viscosity of the inkjet ink is preferably smaller than 30 mPa·s, more preferably lower than 15 mPa·s, and most preferably between 2 and 10 mPa·s at a shear rate of $100 \text{ s}^{-1}$ and a jetting temperature between 10 and 70° C.

Second Radiation Curable Composition

The second radiation curable composition includes one or more colorants, more preferably colour pigments. The second radiation curable composition is here below also referred to as a radiation curable inkjet ink.

In a preferred embodiment, a set of second radiation curable compositions including colorants is used. Such a set of second radiation curable compositions including colorants are here below also referred to as a radiation curable inkjet ink set.

In a preferred embodiment, the inkjet ink set includes a first radiation curable composition curable by free radical polymerization or cationic polymerization and a second composition curable by a different polymerization than the first composition but selected from the group consisting of free radical polymerization and cationic polymerization characterized in that the first composition contains a cationically polymerizable compound having at least one (meth)acrylate group present in the first curable composition in an amount of at least 25 wt % based upon the total weight of the first curable composition. In one more preferred embodiment of the inkset the first radiation curable composition contains titanium dioxide.

In a preferred embodiment, the inkjet ink set includes a radiation curable composition A curable by free radical polymerization, a radiation curable composition B curable by cationic polymerization and a radiation curable inkjet ink wherein the radiation curable compositions A and B contain a cationically polymerizable compound having at least one (meth)acrylate group present in the first curable composition in an amount of at least 25 wt % based upon the total weight of the first curable composition.

The radiation curable inkjet ink set preferably includes at least one yellow curable inkjet ink (Y), at least one cyan curable inkjet ink (C) and at least one magenta curable inkjet ink (M) and preferably also at least one black curable inkjet ink (K). The curable CMYK inkjet ink set may also be extended with extra inks such as red, green, blue, and/or orange to further enlarge the colour gamut of the image. The CMYK ink set may also be extended by the combination of full density and light density inks of both colour inks and/or black inks to improve the image quality by lowered graininess. The curable CMYK inkjet ink set may also be extended with extra inks for spot colors, such as silver or gold, which are important in certain inkjet printing applications, e.g. sign and displays.

In a preferred embodiment, the radiation curable inkjet ink set includes a colourless radiation curable inkjet ink, for example, for influencing the glossiness of a printed image.

In a very preferred embodiment, the radiation curable inkjet ink set includes at least one first curable composition and at least one second curable composition.

In one very preferred embodiment, the radiation curable inkjet ink set includes at least one cationically polymerizable first curable composition and at least one free radical polymerizable second curable composition. A preferred embodiment thereof is a radiation curable inkjet ink set including a colourless and/or a white cationically polymerizable inkjet ink and at least one cyan free radical polymerizable inkjet ink, at least one magenta free radical polymerizable inkjet ink, at least one yellow free radical polymerizable inkjet ink and at least one black free radical polymerizable inkjet ink.

In one very preferred embodiment, the radiation curable inkjet ink set includes at least one free radical polymerizable first curable composition and at least one cationically polymerizable second curable composition. A preferred embodiment thereof is a radiation curable inkjet ink set including a colourless and/or a white free radical polymerizable inkjet ink and at least one cyan cationically polymerizable inkjet ink, at least one magenta cationically polymerizable inkjet ink, at least one yellow cationically polymerizable inkjet ink and at least one black cationically polymerizable inkjet ink.

In a preferred embodiment, the radiation curable inkjet ink set is a UV-curable inkjet ink set.

The radiation curable inkjet inks contain at least one photoinitiator. If the primer is a cationically polymerizable first radiation curable composition, then the radiation curable inkjet inks include a free radical photoinitiator, i.e. a Norrish Type I or Type II photoinitiator. If the primer is a free radical polymerizable first radiation curable composition, then the radiation curable inkjet inks include a cationic photoinitiator, such as a photo-acid generating agent.

In the case of free radical polymerizable inkjet inks, they may further also contain at least one co-initiator or polymerization synergist. Frequently a tertiary amine compound is used as co-initiator. The amount of co-initiator or co-initiators is in general from 0.01 to 50 wt %, preferably from 0.05 to 25 wt %, preferably from 0.1 to 10 wt %, based in each case on the total weight of the curable inkjet ink.

The radiation curable inkjet inks may further also contain at least one inhibitor.

The radiation curable inkjet inks may further also contain at least one surfactant.

The radiation curable inkjet ink preferably does not contain an evaporable component such as an organic solvent or water.

The radiation curable inkjet ink may contain a dispersion synergist to improve the dispersion quality of the colour pigment in the inkjet ink. Preferably, at least the magenta inkjet ink contains a dispersion synergist. A mixture of dispersion synergists may be used to further improve dispersion stability.

The viscosity of the inkjet ink is preferably smaller than 100 mPa·s at 30° C. and at a shear rate of 100 s$^{-1}$. The viscosity of the inkjet ink is preferably smaller than 30 mPa·s, more preferably lower than 15 mPa·s, and most preferably between 2 and 10 mPa·s at a shear rate of 100 s$^{-1}$ and a jetting temperature between 10 and 70° C.

Compounds Polymerizable by Both Free Radical and Cationic Polymerization

The compounds polymerizable by both free radical and cationic polymerization have at least one functional group which is polymerizable by free radical polymerization, such as an acrylate, and at least one functional group which is cationically polymerizable, such as a vinylether, an epoxide or an oxetane.

A preferred class of compounds polymerizable by both free radical and cationic polymerization are vinyl ether acrylates. Preferred compounds polymerizable by both free radical and cationic polymerization are those disclosed in U.S. Pat. No. 6,310,115 (AGFA), incorporated herein by reference. Particularly preferred compounds are 2-(2-vinyloxyethoxy)ethyl(meth)acrylate, most preferably the compound is 2-(2-vinyloxyethoxy)ethyl acrylate.

The compound polymerizable by both free radical polymerization and cationic polymerization is preferably a radiation curable monomer represented by Formula (I):

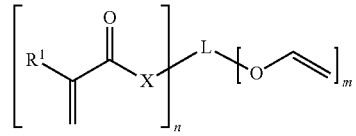

Formula (I)

wherein, $R^1$ represents hydrogen, or a substituted or unsubstituted alkyl group, L represents a linking group including at least one carbon atom, X represents O, S or $NR^2$ wherein $R^2$ has the same meaning as $R^1$;

when $X=NR^2$, L and $R^2$ may form together a ring system, and n and m independently represent a value from 1 to 5.

In a preferred embodiment, the compound according to Formula (I) has $R^1$ representing hydrogen, X representing O, and n representing a value of 1. The value of m is preferably 1, 2 or 3. L preferably includes 2, 3 or 4 carbon atoms.

The compound polymerizable by both free radical polymerization and cationic polymerization used in the inkjet printing method according to a preferred embodiment of the present invention is preferably selected from the group consisting of the monomers listed in TABLE 1
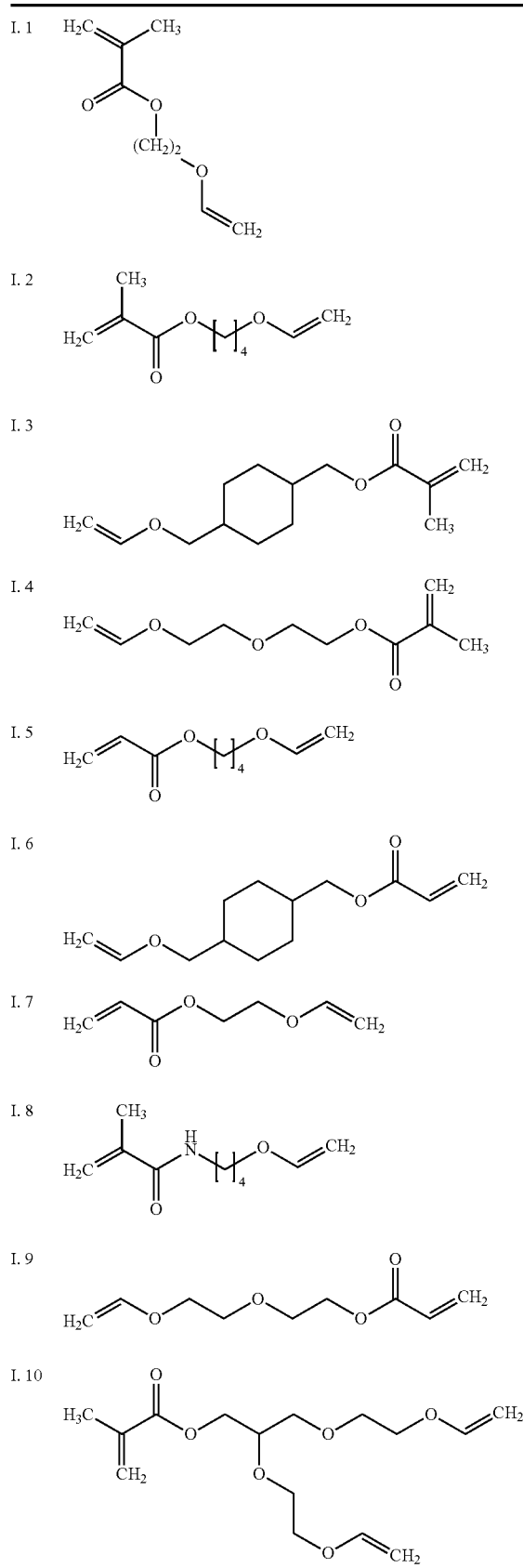

TABLE 1-continued
I. 11
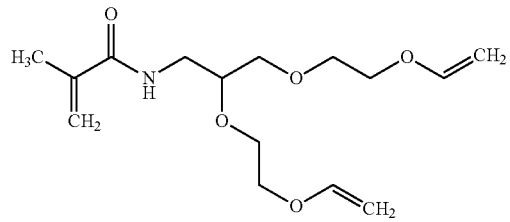
I. 12
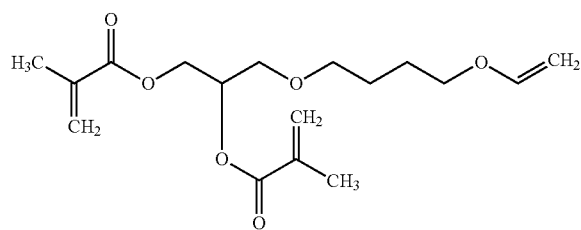 [SMILES: C=COCCCCOCC(COC(=O)C(=C)C)OC(=O)C(=C)C]
I. 13
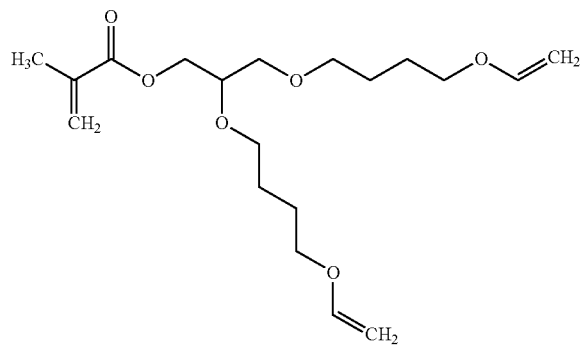 [SMILES: C=COCCCCOCC(COC(=O)C(=C)C)OCCCCOC=C]
I. 14
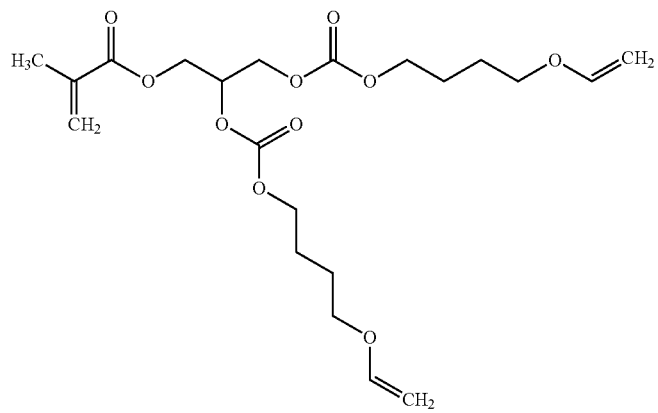 [SMILES: C=COCCCCOC(=O)OCC(COC(=O)C(=C)C)OC(=O)OCCCCOC=C]
I. 15
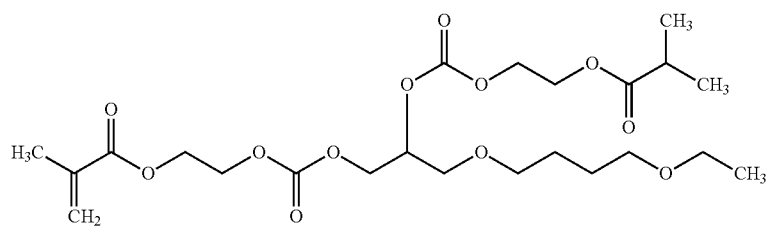 [SMILES: C=C(C)C(=O)OCCOC(=O)OCC(COCCCCOCC)OC(=O)OCCOC(=O)C(C)C]

TABLE 1-continued
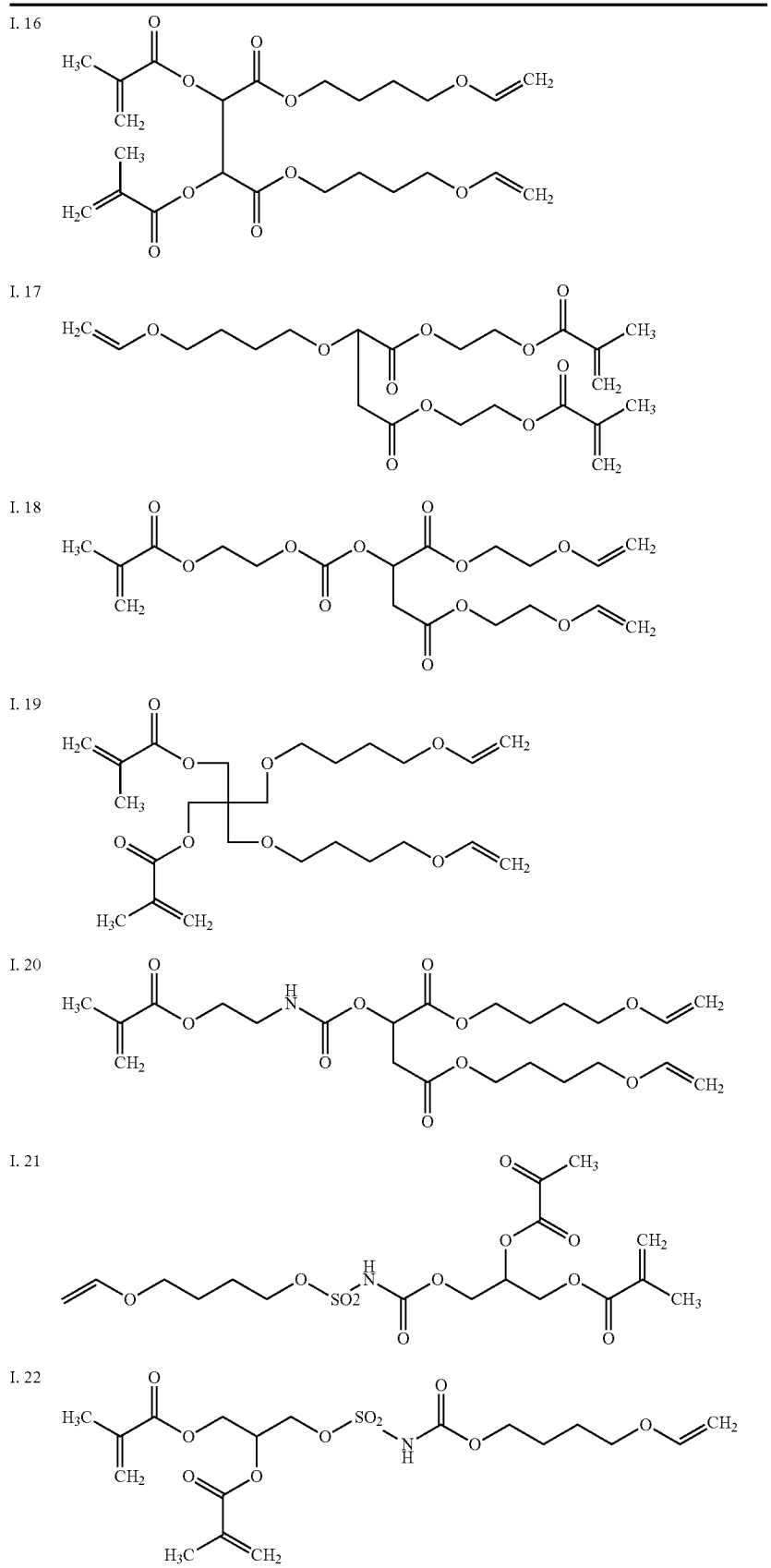

TABLE 1-continued

I. 23

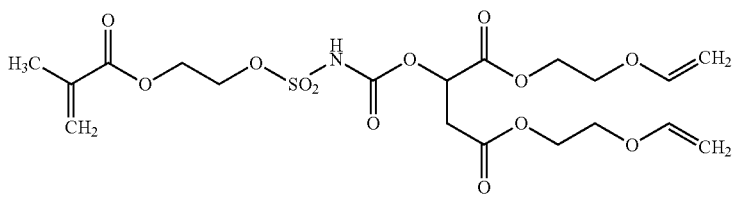 [SMILES: C=COCCOC(=O)CC(OC(=O)NS(=O)(=O)OCCOC(=O)C(=C)C)C(=O)OCCOC=C]

Other suitable vinyl ether(meth)acrylates are those disclosed in columns 3 and 4 of US 67679890 B (NIPPON SHOKUBAI), incorporated herein by specific reference.

The compounds of Table 1 can be prepared according to standard synthetic methods known to those skilled in the art of organic synthesis. Suitable synthetic methods are disclosed in U.S. Pat. No. 6,310,115 (AGFA) and US 67679890 B (NIPPON SHOKUBAI).

The compound polymerizable by both free radical and cationic polymerization is preferably present in an amount of at least 20 wt %, more preferably at least 30 wt % and most preferably at least 40 wt % based upon the total weight of the first radiation curable composition used in the inkjet printing method according to a preferred embodiment of the present invention.

A single compound or a mixture of compounds polymerizable by both free radical and cationic polymerization can be used in the first radiation curable composition used in the inkjet printing method according to a preferred embodiment of the present invention.

One or more compounds polymerizable by both free radical and cationic polymerization may also be present in the second radiation curable composition used in the inkjet printing method according to a preferred embodiment of the present invention.

Other Monomers and Oligomers

Any monomer or oligomer may be used in the first and second radiation curable compositions. However, preferably the monomers and/or oligomers in the first radiation curable composition polymerize in the same manner as the compound which is polymerizable by both free radical polymerization and cationic polymerization. This means that for a free radical polymerizable first radiation curable composition that the other monomers and/or oligomers are also free radical polymerizable. In the case of a cationically polymerizable first radiation curable composition, the other monomers and/or oligomers are also cationically polymerizable.

A combination of monomers and/or oligomers may also be used. The monomers and/or oligomers may possess different degrees of functionality, and a mixture including combinations of mono-, di-, tri- and higher functionality monomers and/or oligomers may be used. The viscosity of the radiation curable composition may be adjusted by varying the ratio between the monomers and oligomers.

Any polymerizable compound commonly known in the art may be employed and include monofunctional and/or polyfunctional acrylate monomers, oligomers or prepolymers, such as isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethylhexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylate, vinyl ether ethoxy acrylate, 2-acryloyloxyethylsuccinic acid, 2-acryloyxyethylphthalic acid, 2-acryloxyethyl-2-hydroxyethyl-phthalic acid, lactone modified flexible acrylate, and t-butylcyclohexyl acrylate, triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate, glycerinpropoxy triacrylate, and caprolactam modified dipentaerythritol hexaacrylate, or an N-vinylamide such as, N-vinylcaprolactam or N-vinylformamide; or acrylamide or a substituted acrylamide, such as acryloylmorpholine.

Other suitable monofunctional acrylates include caprolactone acrylate, cyclic trimethylolpropane formal acrylate, ethoxylated nonyl phenol acrylate, isodecyl acrylate, isooctyl acrylate, octyldecyl acrylate, alkoxylated phenol acrylate, tridecyl acrylate and alkoxylated cyclohexanone dimethanol diacrylate.

Other suitable difunctional acrylates include alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate and neopentyl glycol diacrylate.

Other suitable trifunctional acrylates include propoxylated glycerine triacrylate and propoxylated trimethylolpropane triacrylate.

Other higher functional acrylates include di-trimethylolpropane tetraacrylate, dipentaerythritol pentaacrylate, ethoxylated pentaerythritol tetraacrylate, methoxylated glycol acrylates and acrylate esters.

Furthermore, methacrylates corresponding to the above-mentioned acrylates may be used with these acrylates. Of the methacrylates, methoxypolyethylene glycol methacrylate, methoxytriethylene glycol methacrylate, hydroxyethyl methacrylate, phenoxyethyl methacrylate, cyclohexyl methacrylate, tetraethylene glycol dimethacrylate, vinyl ether ethoxy methacrylate, and polyethylene glycol dimethacrylate are preferred due to their relatively high sensitivity and higher adhesion to an ink-receiver surface.

Furthermore, polymerizable oligomers which may be used, include epoxy acrylates, aliphatic urethane acrylates, aromatic urethane acrylates, polyester acrylates, and straight-chained acrylic oligomers.

Suitable examples of styrene compounds are styrene, p-methylstyrene, p-methoxystyrene, β-methylstyrene, p-methyl-β-methylstyrene, α-methylstyrene and p-methoxy-β-methylstyrene.

Suitable examples of vinylnaphthalene compounds are 1-vinylnaphthalene, α-methyl-1-vinylnaphthalene, β-methyl-1-vinylnaphthalene, 4-methyl-1-vinylnaphthalene and 4-methoxy-1-vinylnaphthalene.

Suitable examples of N-vinyl compounds are N-vinylcarbazole, N-vinylpyrrolidone, N-vinylindole, N-vinylpyrrole, N-vinylphenothiazine, N-vinylacetoanilide, N-vinylethylacetoamide, N-vinylsuccinimide, N-vinylphthalimide, N-vinylcaprolactam and N-vinylimidazole.

The cationically polymerizable compound can be one or more monomers, one or more oligomers or a combination thereof.

Suitable examples of cationically curable compounds can be found in Advances in Polymer Science, 62, pages 1 to 47 (1984) by J. V. Crivello.

The cationic curable compound may contain at least one olefin, thioether, acetal, thioxane, thietane, aziridine, N-, O-, S- or P-heterocycle, aldehyde, lactam or cyclic ester group.

Examples of cationic polymerizable compounds include monomers and/or oligomers epoxides, vinyl ethers, styrenes, oxetanes, oxazolines, vinylnaphthalenes, N-vinyl heterocyclic compounds, tetrahydrofurfuryl compounds.

The cationically polymerizable monomer can be mono-, di- or multi-functional or a mixture thereof.

Suitable cationic curable compounds having at least one epoxy group are listed in the "Handbook of Epoxy Resins" by Lee and Neville, McGraw Hill Book Company, New York (1967) and in "Epoxy Resin Technology" by P. F. Bruins, John Wiley and Sons New York (1968).

Examples of cationic curable compounds having at least one epoxy group include 1,4-butanediol diglycidyl ether, 3-(bis(glycidyloxymethyl)methoxy)-1,2-propane diol, limonene oxide, 2-biphenyl glycidyl ether, 3,4-epoxycyclohexylmethyl-3',4'-epoxycyclohexane carboxylate, epichlorohydrin-bisphenol S based epoxides, epoxidized styrenics and more epichlorohydrin-bisphenol F and A based epoxides and epoxidized novolaks.

Suitable epoxy compounds including at least two epoxy groups in the molecule are alicyclic polyepoxide, polyglycidyl ester of polybasic acid, polyglycidyl ether of polyol, polyglycidyl ether of polyoxyalkylene glycol, polyglycidyl ester of aromatic polyol, polyglycidyl ether of aromatic polyol, urethane polyepoxy compound, and polyepoxy polybutadiene.

Examples of cycloaliphatic bisepoxides include copolymers of epoxides and hydroxyl components such as glycols, polyols, or vinyl ether, such as 3,4-epoxycyclohexylmethyl-3',4'-epoxycyclohexylcarboxylate; bis(3,4-epoxycyclohexylmethyl)adipate; limonene bisepoxide; diglycidyl ester of hexahydrophthalic acid.

Examples of vinyl ethers having at least one vinyl ether group include n-butyl vinyl ether, isobutyl vinyl ether, octadecyl vinyl ether, cyclohexyl vinyl ether, butanediol divinyl ether, hydroxyl butyl vinyl ether, cyclohexane dimethanol monovinyl ether, phenyl vinyl ether, p-methylphenyl vinyl ether, p-methoxyphenyl vinyl ether, α-methylphenyl vinyl ether, β-methylisobutyl vinyl ether and β-chloroisobutyl vinyl ether, diethyleneglycol divinyl ether, triethylene glycol divinyl ether, n-propyl vinyl ether, isopropyl vinyl ether, dodecyl vinyl ether, diethylene glycol monovinyl ether, cyclohexanedimethanol divinyl ether, 4-(vinyloxy)butyl benzoate, bis[4-(vinyl oxy)butyl]adipate, bis[4-(vinyl oxy)butyl] succinate, 4-(vinyloxy methyl)cyclohexylmethyl benzoate, bis[4-(vinyloxy)butyl]isophthalate, bis[4-(vinyloxymethyl) cyclohexylmethyl]glutarate, tris[4-(vinyloxy)butyl]trimellitate, 4-(vinyloxy)butyl steatite, bis[4-(vinyloxy)butyl]hexanediylbiscarbamate, bis[4-(vinyloxy)methyl]cyclohexyl] methyl]terephthalate, bis[4-(vinyloxy)methyl]cyclohexyl] methyl]isophthalate, bis[4-(vinyloxy)butyl](4-methyl-1,3-phenylene)-biscarbamate, bis[4-vinyloxy)butyl] (methylenedi-4,1-phenylene)biscarbamate and 3-amino-1-propanol vinyl ether.

Suitable examples of oxetane compounds having at least one oxetane group include 3-ethyl-3-hydroloxymethyl-1-oxetane, the oligomeric mixture 1,4-bis[3-ethyl-3-oxetanyl methoxy)methyl]benzene, 3-ethyl-3-phenoxymethyl-oxetane, bis ([1-ethyl(3-oxetanyl)]methyl)ether, 3-ethyl-3-[(2-ethylhexyloxy)methyl]oxetane, 3-ethyl-[(tri-ethoxysilyl propoxy)methyl]oxetane and 3,3-dimethyl-2(p-methoxyphenyl)-oxetane.

Photoinitiators

The first and second radiation curable compositions contain a photoinitiator or photoinitiator system such as, for example, one or more photoinitiators and one or more co-initiators. The photo-initiator or photoinitiator system absorbs light and is responsible for the production of initiating species, such as free radicals and cations. Free radicals and cations are high-energy species that induce polymerization of monomers, oligomers and polymers and with polyfunctional monomers and oligomers thereby also inducing cross-linking.

Irradiation with actinic radiation may be realized in two steps by changing wavelength or intensity. In such cases it is preferred to use 2 types of photoinitiator together.

Free radical photoinitiators can act as a Norrish type I or a Norrish type II initiator. Tertiary amines are today admixed to free radical polymerizable radiation curable formulations for two main reasons:

i) They counteract air inhibition, provided that the particular amine contains abstractable α-hydrogens, by formation of radicals, which can participate and trigger radical polymerisation of acrylic groups. Tertiary amines can therefore be used together with Norrish type I photoinitiators to reduce air inhibition and thereby increase cure speed; and ii) They can act as co-initiators together with ketones of the benzophenone type, wherein the excited keto groups abstract a hydrogen from the amine, whereby radicals are formed promoting radical polymerisation of acrylic groups and the like. This is the so called Norrish type II of photopolymerization.

A preferred Norrish type I-initiator is selected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and α-phenylglyoxalates.

A preferred Norrish type II-initiator is selected from the group consisting of benzophenones, thioxanthones, 1,2-diketones and anthraquinones. A preferred co-initiator is selected from the group consisting of an aliphatic amine, an aromatic amine and a thiol. Tertiary amines, heterocyclic thiols and 4-dialkylamino-benzoic acid are particularly preferred as co-initiator.

Suitable photo-initiators are disclosed by CRIVELLO, J. V., et al.; Chemistry & technology of UV & EB Formulation for Coatings, Inks & Paints. Volume III: Photoinitiators for Free Radical, Cationic & Anionic Photopolymerisation, 2nd edition, John Wiley & Sons Ltd in association with SITA Technology Ltd, London, UK, 1998 edited by Dr. G. Bradley; ISBN 0471 978922, page 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis(2,6-dimethylbenzoyl)-2,4,4-trimethylpentylphosphine oxide, 2,4,6-trimethylbenzoyl diphenylphosphine oxide, 2-methyl-1-[4-(methylthio)phenyl]-2-morpholinopropan-1-one, 2,2-dimethoxy-1,2-diphenylethan-1-one or 5,7-diiodo-3-butoxy-6-fluorone.

Suitable commercial photo-initiators include IRGACURE™ 127, IRGACURE™ 184, IRGACURE™ 500, IRGACURE™ 907, IRGACURE™ 369, IRGACURE™ 1700, IRGACURE™ 651, IRGACURE™ 819, IRGACURE™ 1000, IRGACURE™ 1300, IRGACURE™ 1870, DAROCUR™ 1173, DAROCUR™ 2959, DAROCUR™ 4265 and DAROCUR™ ITX available from CIBA SPECIALTY CHEMICALS; Genopol TX from RAHN AG; Lucerin TPO available from BASF AG, ESACURE™ KT046, Esacure™ KIP150, ESACURE™ KT37 and ESACURE™ EDB available from LAMBERT; H-NU™ 470 and H-NU™ 470X available from SPECTRA GROUP Ltd.

Suitable cationic photo-initiators include compounds, which form aprotic acids or Bronstead acids upon exposure to ultraviolet and/or visible light sufficient to initiate polymerization. The photo-initiator used may be a single compound, a mixture of two or more active compounds, or a combination of two or more different compounds, i.e. co-initiators. Non-limiting examples of suitable cationic photo-initiators are aryldiazonium salts, diaryliodonium salts, triarylsulphonium salts, triarylselenonium salts and the like.

Suitable commercial cationic photoinitiators include R-GEN™ 1130, R-GEN™ BF-1172, R-GEN™ 261, CHIVACURE™ 1176 and CHIVACURE™ 1190 from Chitec Technology Co., Ltd.; IRGACURE™ 250 from Ciba Specialty Products; UV9387C and UV9380C from GE Silicones; CYRACURE™ Photoinitiator UVI-6976 and UVI-6992 from The Dow Chemical Company; OMNICAT™ series from IGM Resins, including OMNICAT 432™ (sulfonium type), OMNICAT™ 440 (iodonium type), OMNICAT™ 445 (iodonium type), OMNICAT™ 550 and OMNICAT™ 650 (polymeric type); ESACURE™ 1064, ESACURE™ 1187 and ESACURE™ 1188 from Lamberti S.p.A.; Adeka OPTOMER™ SP series of aromatic sulfonium types cationic photo-initiatiors from Adeka Corporation, e.g. Adeka OPTOMER™ SP-152; and OMPH076 from ABCR Gmbh & Co. KG, a blend of an aromatic sulfonium and aromatic thioether (available by B & S Specialties BV under the tradename Sarcat KI85).

The radiation curable compositions may contain a photoinitiator system containing one or more photo-initiators and one or more sensitizers that transfer energy to the photoinitiator(s). Suitable sensitizers include photoreducible xanthene, fluorene, benzoxanthene, benzothioxanthene, thiazine, oxazine, coumarin, pyronine, porphyrin, acridine, azo, diazo, cyanine, merocyanine, diarylmethyl, triarylmethyl, anthraquinone, phenylenediamine, benzimidazole, fluorochrome, quinoline, tetrazole, naphthol, benzidine, rhodamine, indigo and/or indanthrene dyes. The amount of the sensitizer is in general from 0.01 to 15 wt %, preferably from 0.05 to 5 wt %, based in each case on the total weight of the radiation curable composition.

For safety reasons, in particular for food packaging applications, preferably diffusion hindered photoinitiators and/or co-initiators are used.

A diffusion hindered initiator is preferably selected from the group consisting of non-polymeric di- or multifunctional initiators, oligomeric or polymeric initiators and polymerisable initiators. More preferably the diffusion hindered photoinitiator is selected from the group consisting of polymeric initiators and polymerizable initiators.

A preferred amount of diffusion hindered photoinitiator is 0.3-50 wt %, and more preferably 1-15 wt % of the total weight of the radiation curable composition or inkjet ink.

The diffusion hindered photoinitiator may contain one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and α-halophenylglyoxalates.

The diffusion hindered photoinitiator may contain one or more photoinitiating functional groups derived from a Norrish type II-initiator selected from the group consisting of benzophenones, thioxanthones, 1,2-diketones and anthraquinones.

Other photoinitiators suitable for the photoinitiating functional groups in preparing diffusion hindered photoinitiators are disclosed by CRIVELLO, J. V., et al.; Chemistry & technology of UV & EB Formulation for Coatings, Inks & Paints. Volume III: Photoinitiators for Free Radical, Cationic & Anionic Photopolymerisation, 2nd edition, John Wiley & Sons Ltd in association with SITA Technology Ltd, London, UK, 1998 edited by Dr. G. Bradley; ISBN 0471 978922, page 287-294.

Difunctional and Multifunctional Photoinitiators

Typical non-polymeric di- and multifunctional initiators have been disclosed in WO 2005/040083 (LAMBERTI S.P.A), WO 2004/099262 (CIBA SPECIALTY CHEMICALS) and Burrows et al., Surface Coatings International, Part B: Coatings Transactions 87(B2), 127-135 (2004) and by Ye et al., Polymer 47(13), 4603-4612 (2006).

Suitable non-polymeric multifunctional initiators are given below in Table 2 without being limited thereto.

TABLE 2

INI-A1

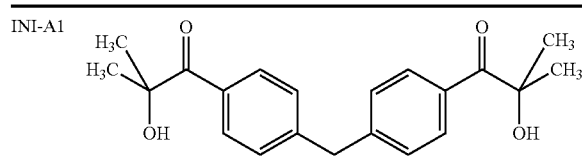

TABLE 2-continued
INI-A2
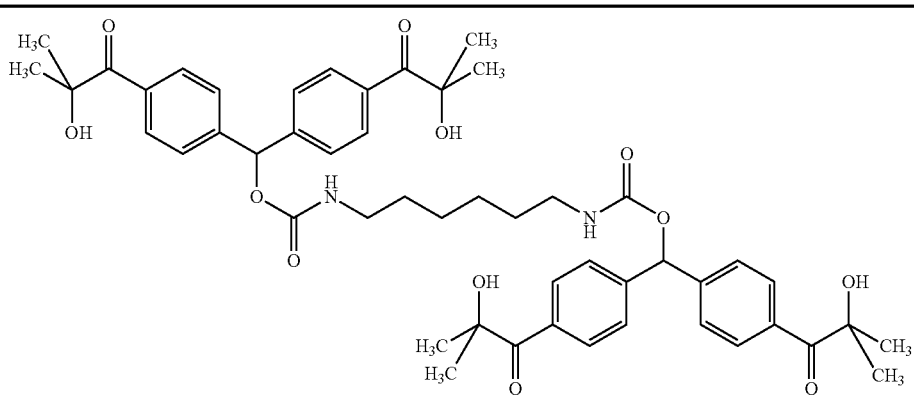
INI-A3
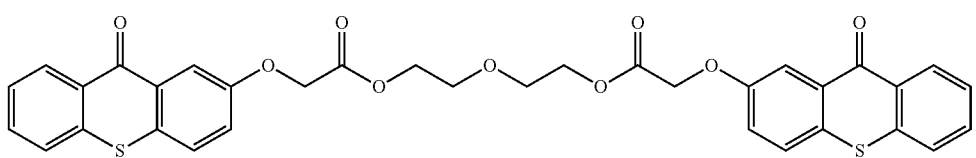 [SMILES: O=C(COc1ccc2sc3ccccc3c(=O)c2c1)OCCOCCOC(=O)COc1ccc2sc3ccccc3c(=O)c2c1]
INI-A4
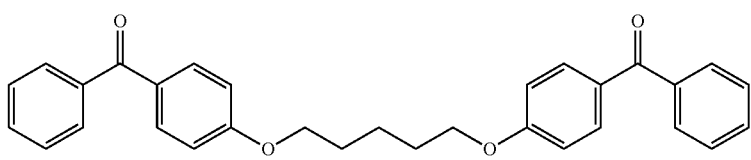 [SMILES: O=C(c1ccccc1)c1ccc(OCCCCCOc2ccc(C(=O)c3ccccc3)cc2)cc1]
INI-A5
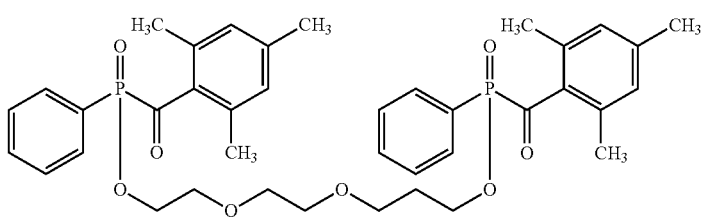 [SMILES: Cc1cc(C)c(C(=O)P(=O)(OCCCOCCOCCOP(=O)(C(=O)c2c(C)cc(C)cc2C)c2ccccc2)c2ccccc2)c(C)c1]
INI-A6
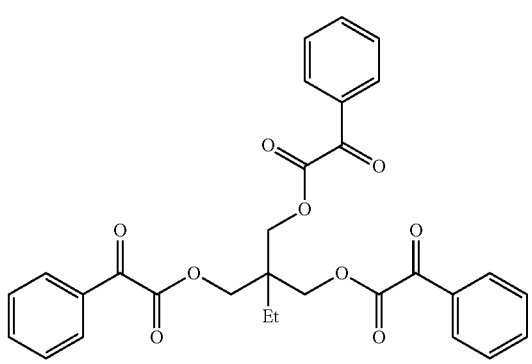 [SMILES: CCC(COC(=O)C(=O)c1ccccc1)(COC(=O)C(=O)c1ccccc1)COC(=O)C(=O)c1ccccc1]
INI-A7
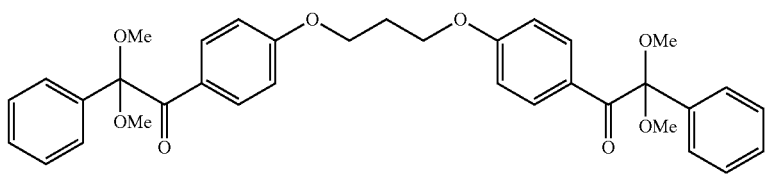 [SMILES: COC(OC)(C(=O)c1ccc(OCCCOc2ccc(C(=O)C(OC)(OC)c3ccccc3)cc2)cc1)c1ccccc1]
INI-A8
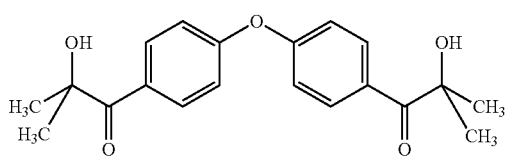 [SMILES: CC(C)(O)C(=O)c1ccc(Oc2ccc(C(=O)C(C)(C)O)cc2)cc1]

TABLE 2-continued

INI-A9

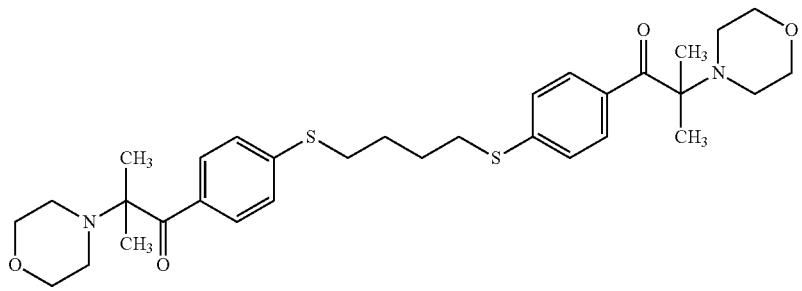 [SMILES: CC(C)(C(=O)c1ccc(SCCCCSc2ccc(C(=O)C(C)(C)N3CCOCC3)cc2)cc1)N1CCOCC1]

INI-A10

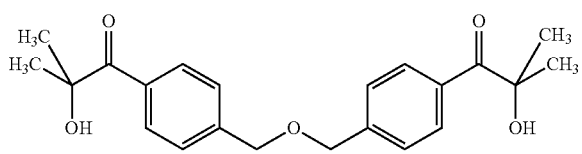 [SMILES: CC(C)(O)C(=O)c1ccc(COCc2ccc(C(=O)C(C)(C)O)cc2)cc1]

In comparison with their monofunctional analogues, it was observed that non-polymeric di- and multifunctional photoinitiators resulted in far less detectable extractables. Another advantage, especially for jettable radiation curable compositions and inkjet inks, is that non-polymeric di- and multifunctional photoinitiators have limited influence on the viscosity, contrary to the polymeric photoinitiators.

Polymeric Photoinitiators

Suitable polymeric initiators have been recently reviewed by Hrdlovic P. (Polymer News, 30(6), 179-182 (2005) and Polymer News, 30(8), 248-250 (2005)) and Corrales T. (Journal of Photochemistry and Photobiology A: Chemistry 159 (2003), 103-114). Further interesting polymeric photoinitiators can be found in CRIVELLO, J. V., et al.; Chemistry & technology of UV & EB Formulation for Coatings, Inks & Paints. Volume III: Photoinitiators for Free Radical, Cationic & Anionic Photopolymerisation, 2nd edition, John Wiley & Sons Ltd in association with SITA Technology Ltd, London, UK, 1998 edited by Dr. G. Bradley; ISBN 0471 978922, page 208-224.

Particularly suitable polymeric and oligomeric photoinitiators have been disclosed by Bertens et al. (RadTech Europe 05, Conference Proceedings (2005) 1, 473-478), by WO 03/033452 (COATES BROTHERS) and by WO 03/033492 (COATES BROTHERS).

For reasons of obtaining low viscosity, the preferred polymeric architecture used in jettable radiation curable compositions and inkjet inks is a dendritic polymeric architecture, more preferably a hyperbranched polymeric architecture. Preferred hyperbranched polymeric photoinitiators for the radiation curable compositions according to the present invention are those disclosed in US 2006014851 (AGFA) and US 2006014853 (AGFA) incorporated herein as a specific reference.

Suitable polymeric and oligomeric initiators are given below in Table 3 without being limited thereto. The hyperbranched structures (INI-B1, INI-B4 and INI-B11) are illustrated with one specific molecular weight and degree of substitution out of the mixture for the sake of clarity.

TABLE 3

INI-B1

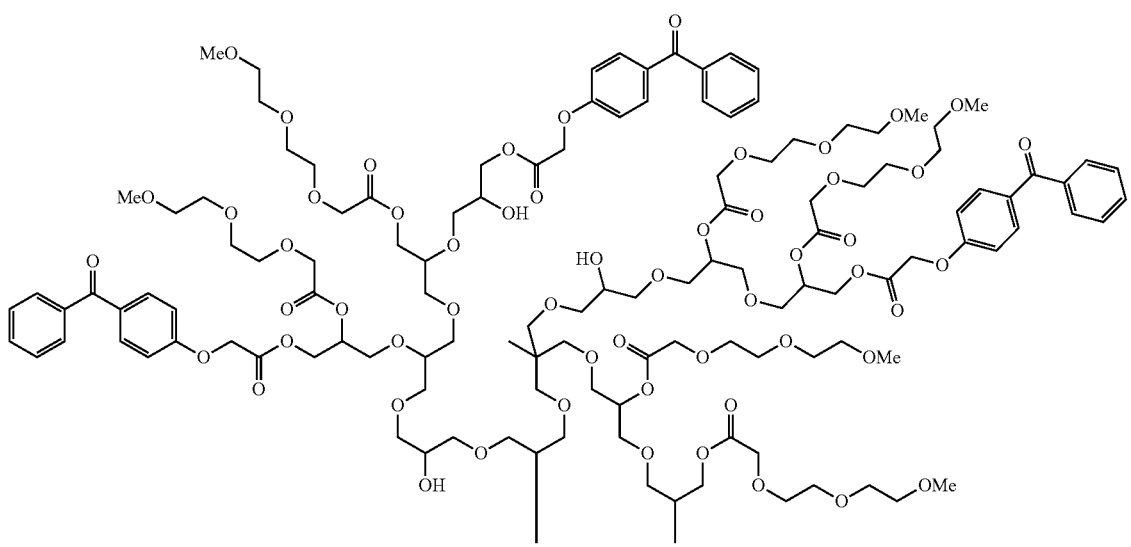

TABLE 3-continued
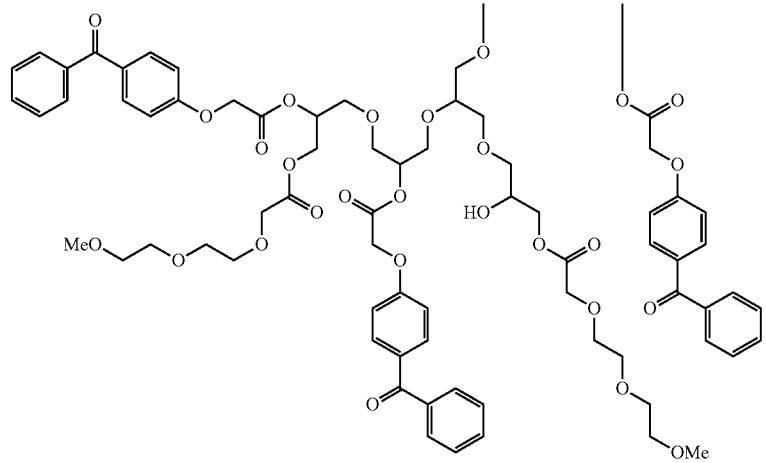
INI-B2
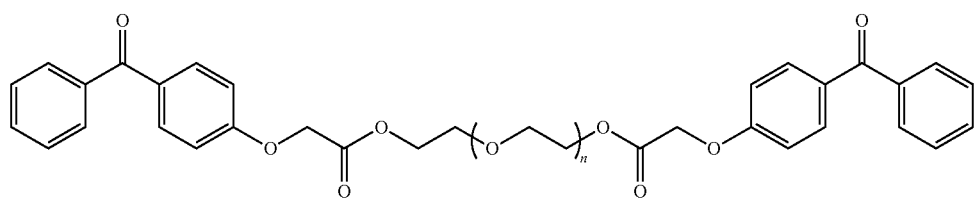
n = 5 on average
INI-B3
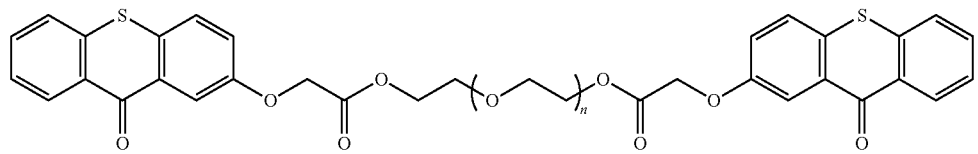
n = 15 on average
INI-B4
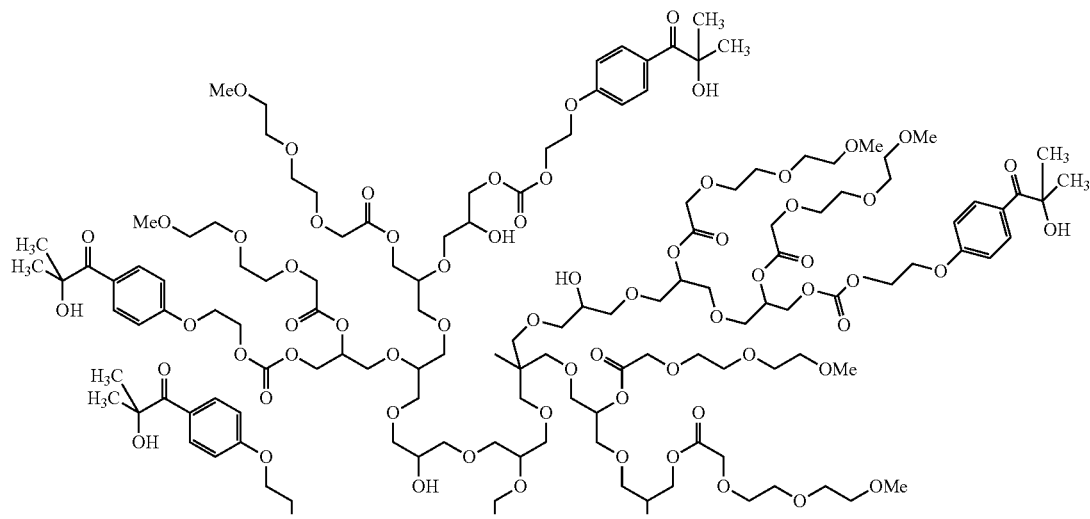

TABLE 3-continued
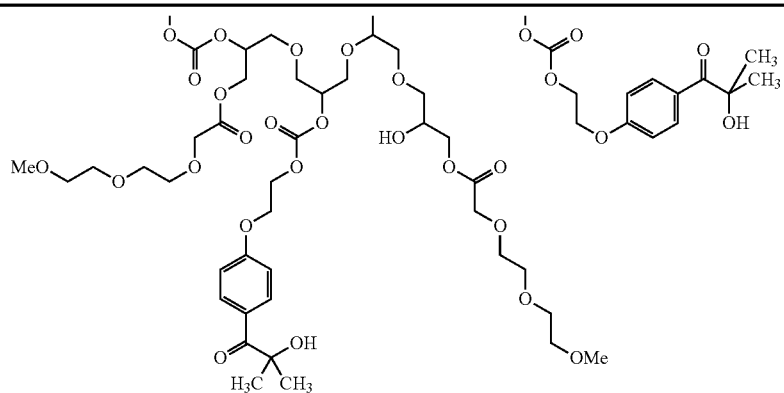
INI-B5
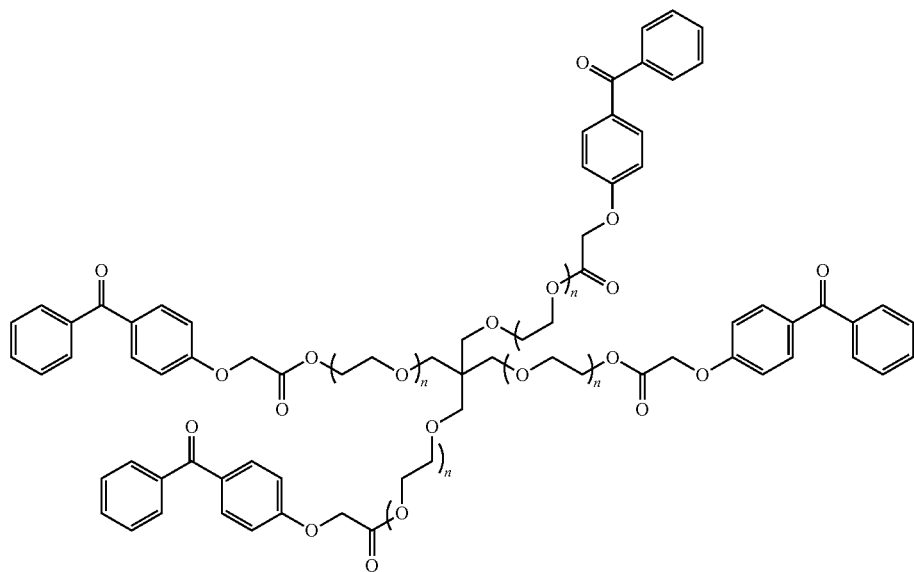
derived from pentaerythritol ethoxylate
(15/4 EO/OH)
INI-B6
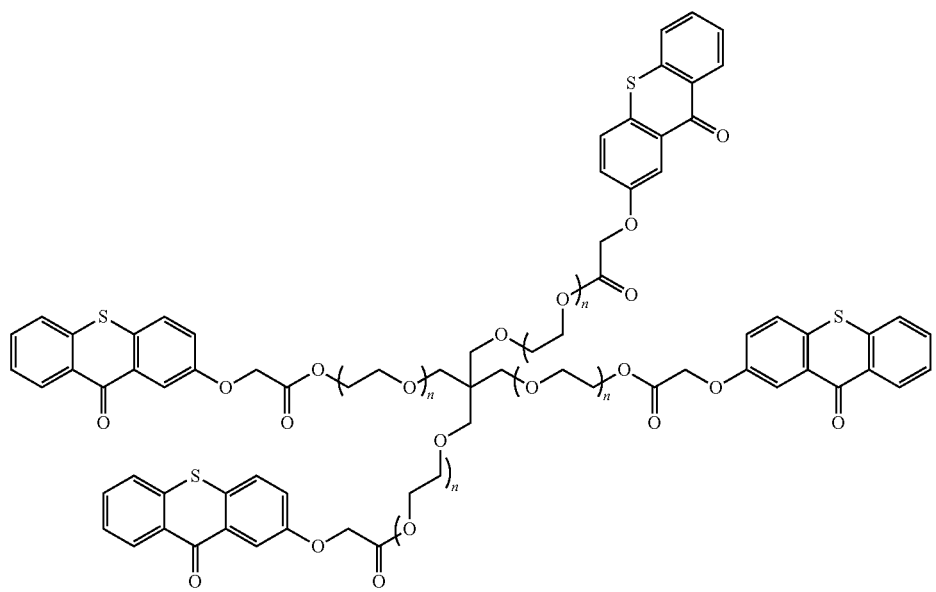
derived from pentaerythritol ethoxylate
(15/4 EO/OH)

TABLE 3-continued
INI-B7
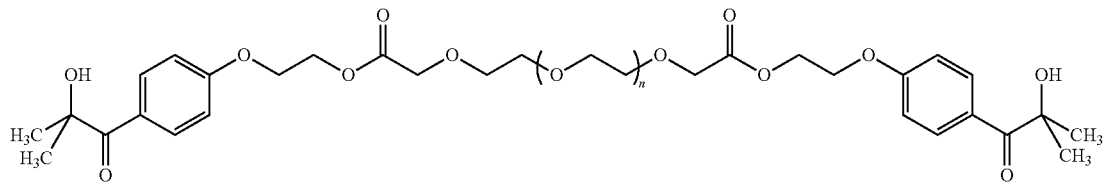
derived from poly(ethylene glycol) bis(carboxymethyl) ether with MW of 250
INI-B8
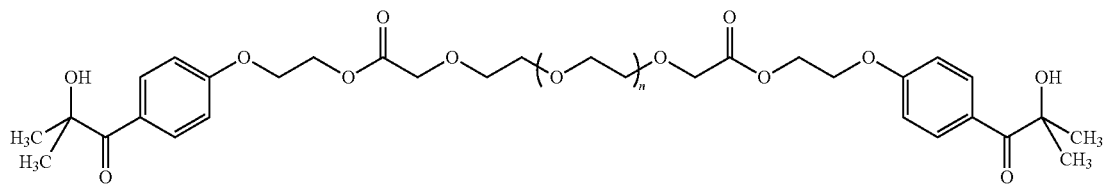
derived from poly(ethylene glycol) bis(carboxymethyl) ether with MW of 600
INI-B9
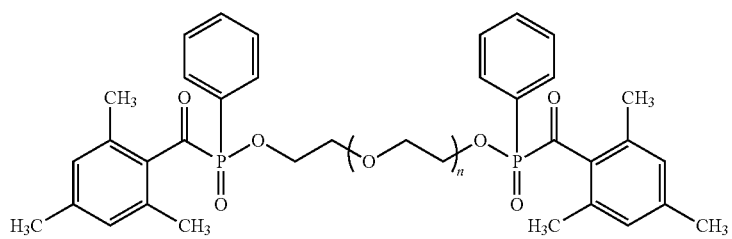
derived from poly(ethylene glycol) with MW of 200
INI-B10
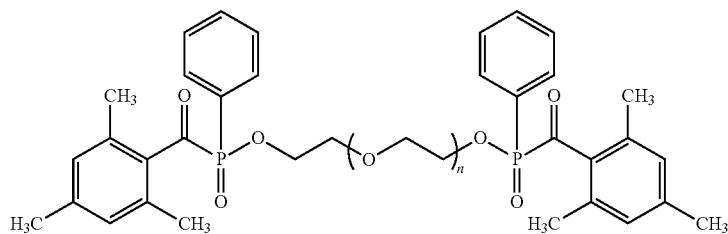
derived from poly(ethylene glycol) with MW of 600
INI-B11
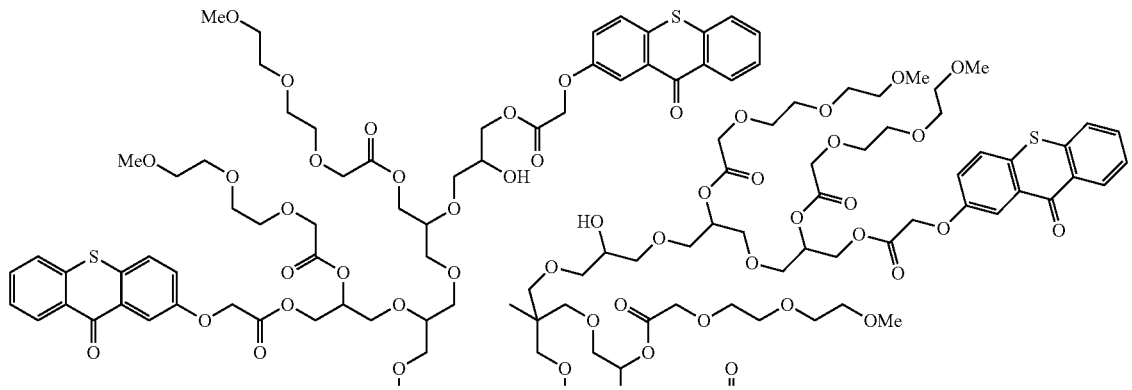

TABLE 3-continued

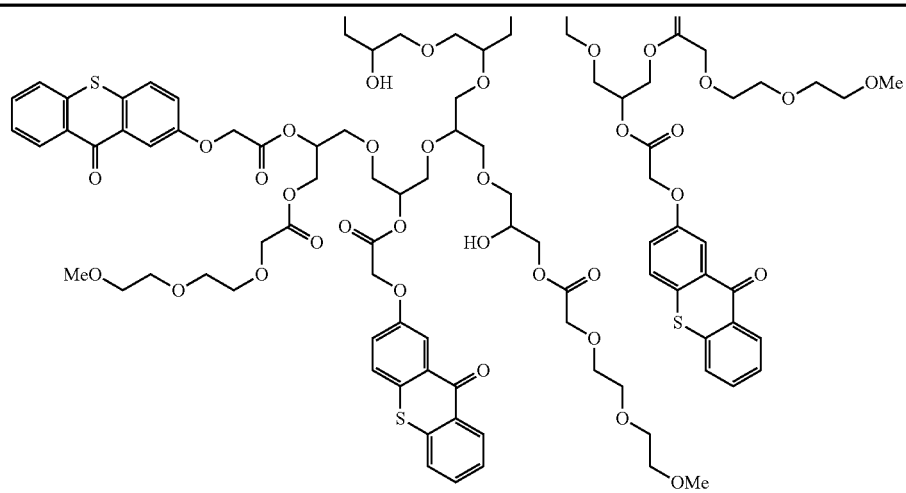

Polymerizable Photoinitiators

Suitable polymerizable photoinitiators have been disclosed in DE 3534645 (MERCK) and EP 0377191 A (BASF). Other suitable polymerizable photoinitiators have been disclosed by Baeumer et al. (RADCUR'86, Conference Proceedings (1986), 4/43-4/55), Ruhlmann et al. (European Polymer Journal, 28(9), 1063-1067 (1992)) and Allen et al. (Journal of Photochemistry and Photobiology, A: Chemistry: 130(1,2), 185-189 (1997)).

Preferred polymerizable photoinitiators are given below in Table 4, without being limited thereto.

TABLE 4

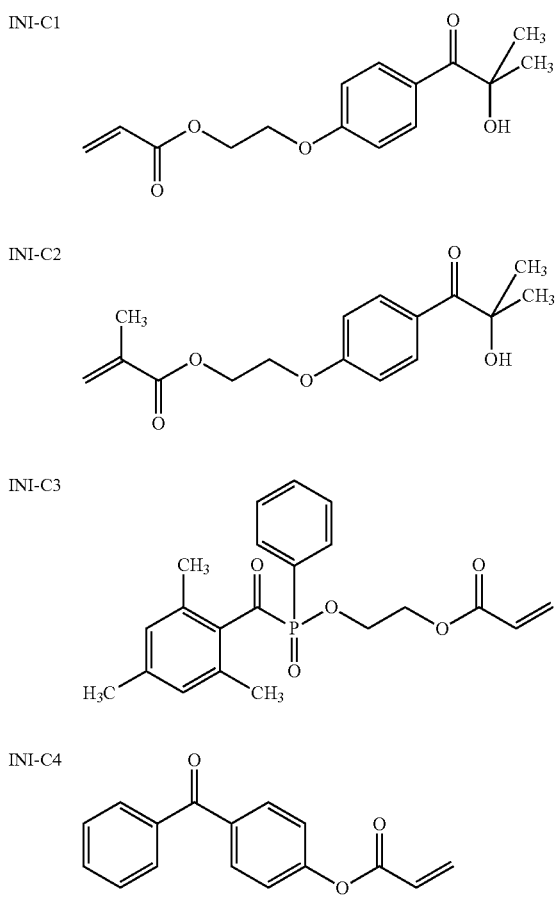

TABLE 4-continued
INI-C5
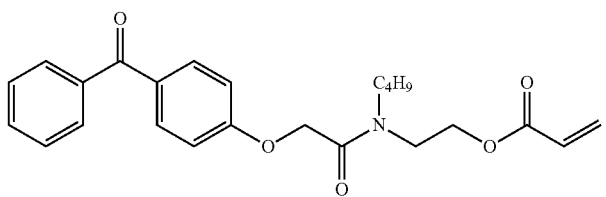
INI-C6
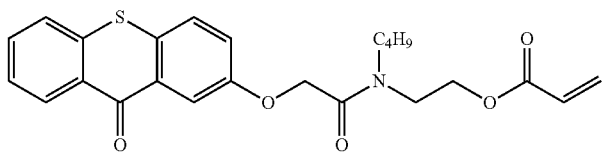
INI-C7
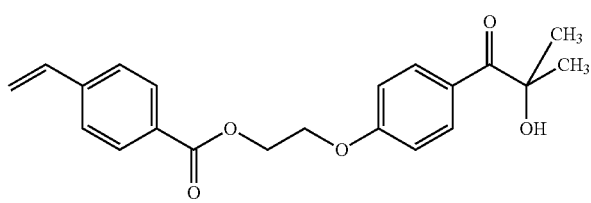 [SMILES: C=Cc1ccc(C(=O)OCCOc2ccc(C(=O)C(C)(C)O)cc2)cc1]
INI-C8
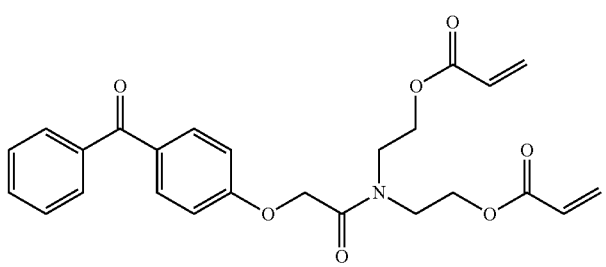 [SMILES: C=CC(=O)OCCN(CCOC(=O)C=C)C(=O)COc1ccc(C(=O)c2ccccc2)cc1]
INI-C9
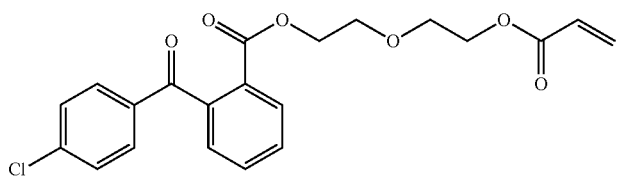 [SMILES: C=CC(=O)OCCOCCOC(=O)c1ccccc1C(=O)c1ccc(Cl)cc1]
INI-C10
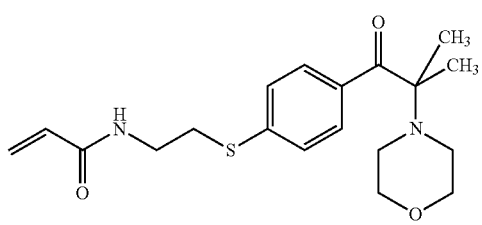 [SMILES: C=CC(=O)NCCSc1ccc(C(=O)C(C)(C)N2CCOCC2)cc1]
INI-C11
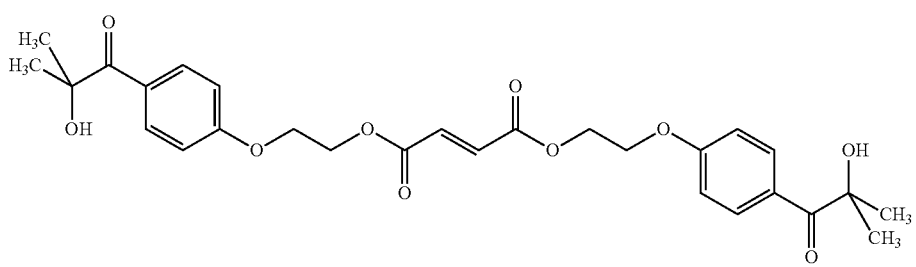 [SMILES: CC(C)(O)C(=O)c1ccc(OCCOC(=O)/C=C/C(=O)OCCOc2ccc(C(=O)C(C)(C)O)cc2)cc1]

TABLE 4-continued

INI-C12

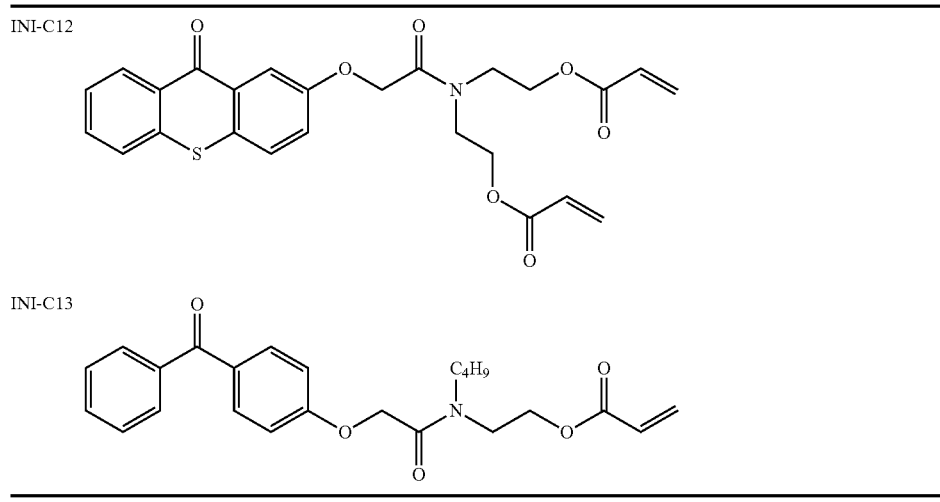

INI-C13

Co-Initiators

In a preferred embodiment the one or more co-initiators are diffusion hindered.

A diffusion hindered co-initiator is preferably selected from the group consisting of non-polymeric di- or multifunctional co-initiators, oligomeric or polymeric co-initiators and polymerisable co-initiators. More preferably the diffusion hindered photoinitiator is selected from the group consisting of polymeric co-initiators and polymerisable co-initiators A suitable polymeric co-initiator is GENOPOL™ AB1 from RAHN.

A preferred diffusion hindered co-initiator is a polymeric co-initiator having a dendritic polymeric architecture, more preferably a hyperbranched polymeric architecture. Preferred hyperbranched polymeric photoinitiators for the radiation curable compositions according to the present invention are those disclosed in US 2006014848 (AGFA) incorporated herein as a specific reference.

Another preferred diffusion hindered co-initiator is one or more polymerizable co-initiators.

A preferred polymerizable co-initiator is a co-initiator according to Formula (I):

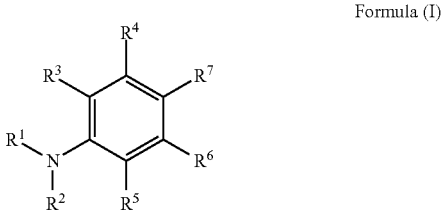

Formula (I)

wherein,
$R^1$ and $R^2$ are independently selected from the group consisting of an alkyl group, an alkenyl group, an alkynyl group, an aralkyl group, an alkaryl group, an aryl group and a heteroaryl group;
$R^3$ to $R^6$ are independently selected from the group consisting of hydrogen, an alkyl group, an alkenyl group, an alkynyl group, an acyl group, a thioalkyl group, an alkoxy group, a halogen, an aralkyl group, an alkaryl group, an aryl group and a heteroaryl group;
$R^7$ is selected from the group consisting of hydrogen, an aldehyde group, a ketone group, an ester group, an amide group, an acyl group, a thioalkyl group, an alkoxy group, a halogen, a nitrile group, a sulphonate group, a sulphonamide group, an alkyl group, an alkenyl group, an alkynyl group, an aralkyl group, an alkaryl group, an aryl group and a heteroaryl group;
$R^1$ and $R^2$, $R^1$ and $R^3$, $R^2$ and $R^5$, $R^3$ and $R^4$, $R^4$ and $R^7$, $R^5$ and $R^6$, and $R^6$ and $R^7$ may represent the necessary atoms to form a 5 to 8 membered ring; and with the proviso that the aromatic amine has at least one alfa hydrogen; and
at least one of $R^1$ to $R^7$ includes a polymerizable ethylenically unsaturated functional group selected from the group consisting of acrylate, substituted acrylate, methacrylate, styrene, acrylamide, methacrylamide, allyl ester, allyl ether, vinyl ester, vinyl ether, fumarate, maleate, maleimide and vinyl nitrile. In the polymerizable co-initiator, preferably $R^7$ represents an electron withdrawing group selected from the group consisting of an aldehyde, a ketone, an ester and an amide, and more preferably $R^3$, $R^4$, $R^5$ and $R^6$ all represent hydrogen.

The alkyl groups, the alkenyl groups, the alkynyl groups, the acyl groups, the thioalkyl groups, the alkoxy groups, the aralkyl groups, the alkaryl groups, the aryl groups and the heteroaryl groups used for $R^1$ to $R^7$ can be substituted or unsubstituted groups, i.e. substituted or unsubstituted alkyl groups, substituted or unsubstituted alkenyl groups, substituted or unsubstituted alkynyl group, substituted or unsubstituted acyl groups, substituted or unsubstituted thioalkyl groups, substituted or unsubstituted alkoxy groups, substituted or unsubstituted aralkyl groups, substituted or unsubstituted alkaryl groups, substituted or unsubstituted aryl groups and substituted or unsubstituted heteroaryl groups may be used.

In a preferred embodiment, the polymerizable co-initiator corresponds to Formula (II):

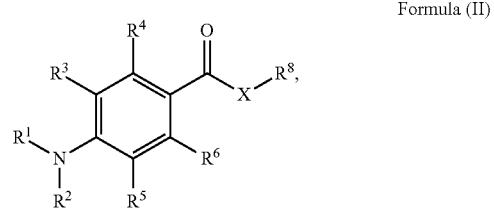

Formula (II)

wherein,
R¹ to R⁶ have the same meaning as defined in claim 1;
X is selected from the group consisting of O, S and NR⁹;
R⁸ and R⁹ are independently selected from the group consisting of hydrogen, an alkyl group, an alkenyl group, an alkynyl group, an aralkyl group, an alkaryl group, an aryl group and a heteroaryl group;
R¹ and R², R¹ and R³, R² and R⁵, R³ and R⁴, R⁵ and R⁶, R⁴ and R⁸, and R⁶ and R⁸ may represent the necessary atoms to form a 5 to 8 membered ring; and at least one of R⁴ to R⁶ and R⁸ includes a polymerizable ethylenically unsaturated functional group selected from the group consisting of acrylate, substituted acrylate, methacrylate, styrene, acrylamide, methacrylamide, allyl ester, allyl ether, vinyl ester, vinyl ether, fumarate, maleate, maleimide and vinyl nitrile. In the polymerizable co-initiator, preferably R³, R⁴, R⁵ and R⁶ all represent hydrogen.

In one preferred embodiment of the polymerizable co-initiator having Formula (II), R¹ represents methyl or ethyl and R² includes a polymerizable ethylenically unsaturated functional group selected from the group consisting of acrylate, substituted acrylate, methacrylate, styrene, acrylamide, methacrylamide, allyl ester, allyl ether, vinyl ester, vinyl ether, fumarate, maleate, maleimide and vinyl nitrile; and more preferably also R³, R⁴, R⁵ and R⁶ all represent hydrogen.

In another preferred embodiment of the polymerizable co-initiator having Formula (II), R¹ and R² independently represent methyl or ethyl and R⁸ includes a polymerizable ethylenically unsaturated functional group selected from the group consisting of acrylate, substituted acrylate, methacrylate, styrene, acrylamide, methacrylamide, allyl ester, allyl ether, vinyl ester, vinyl ether, fumarate, maleate, maleimide and vinyl nitrile; and more preferably also R³, R⁴, R⁵ and R⁶ all represent hydrogen.

In a more preferred embodiment, the polymerizable co-initiator corresponds to Formula (III):

Formula (III)

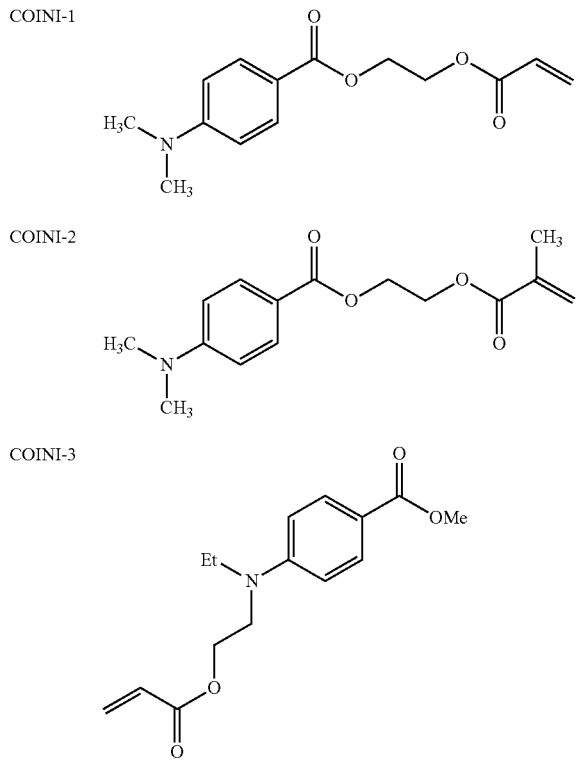

R¹ and R² are independently selected from the group consisting of methyl, ethyl, propyl and butyl;
L represents a divalent linking group including at least one carbon atom; and
R¹⁰ represents hydrogen, methyl, ethyl, propyl or butyl.

In a preferred embodiment the divalent linking group L includes 1 to 30 carbon atoms, more preferably 2 to 10 carbon atoms and most preferably 3 to 6 atoms.

The polymerizable co-initiator may contain two, three or more polymerizable ethylenically unsaturated functional groups independently selected from the group consisting of acrylate, substituted acrylate, methacrylate, styrene, acrylamide, methacrylamide, allyl ester, allyl ether, vinyl ester, vinyl ether, fumarate, maleate, maleimide and vinyl nitrile.

The polymerizable co-initiator may also contain more than one tertiary amine functional group, preferably the second or third tertiary amine functional group is also an aromatic tertiary amine, most preferably a dialkylamino benzoic acid derivative.

Suitable polymerizable co-initiators are given below in Table 5 without being limited thereto.

TABLE 5

COINI-1

COINI-2

COINI-3

TABLE 5-continued
COINI-4
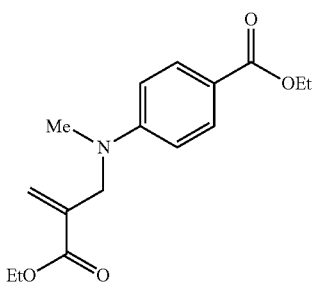 [SMILES: C=C(CN(C)c1ccc(C(=O)OCC)cc1)C(=O)OCC]
COINI-5
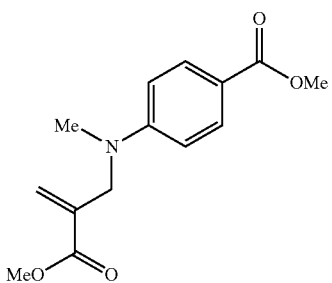 [SMILES: C=C(CN(C)c1ccc(C(=O)OC)cc1)C(=O)OC]
COINI-6
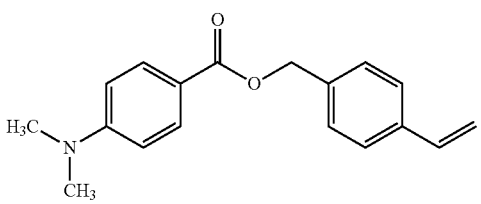 [SMILES: C=Cc1ccc(COC(=O)c2ccc(N(C)C)cc2)cc1]
COINI-7
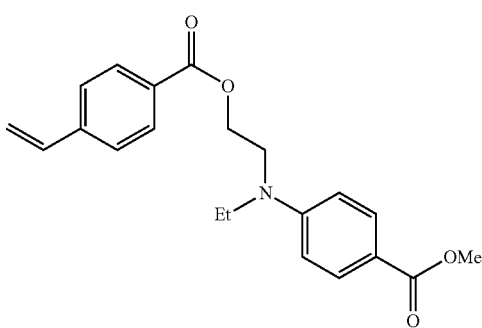 [SMILES: C=Cc1ccc(C(=O)OCCN(CC)c2ccc(C(=O)OC)cc2)cc1]
COINI-8
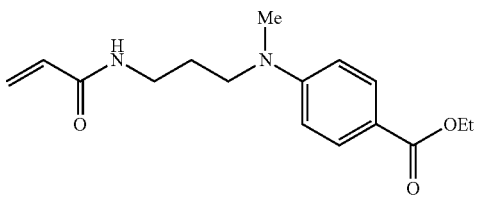 [SMILES: C=CC(=O)NCCCN(C)c1ccc(C(=O)OCC)cc1]
COINI-9
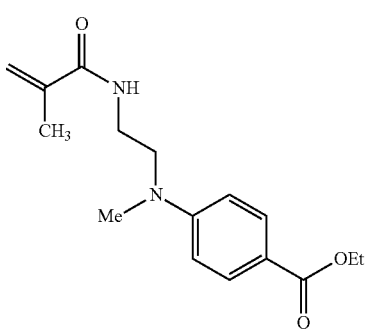 [SMILES: C=C(C)C(=O)NCCN(C)c1ccc(C(=O)OCC)cc1]

TABLE 5-continued
COINI-10
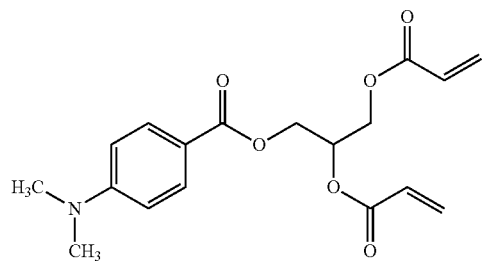 [SMILES: C=CC(=O)OCC(COC(=O)c1ccc(N(C)C)cc1)OC(=O)C=C]
COINI-11
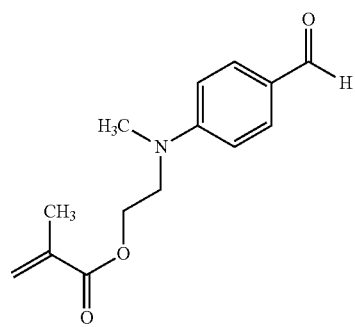 [SMILES: C=C(C)C(=O)OCCN(C)c1ccc(C=O)cc1]
COINI-12
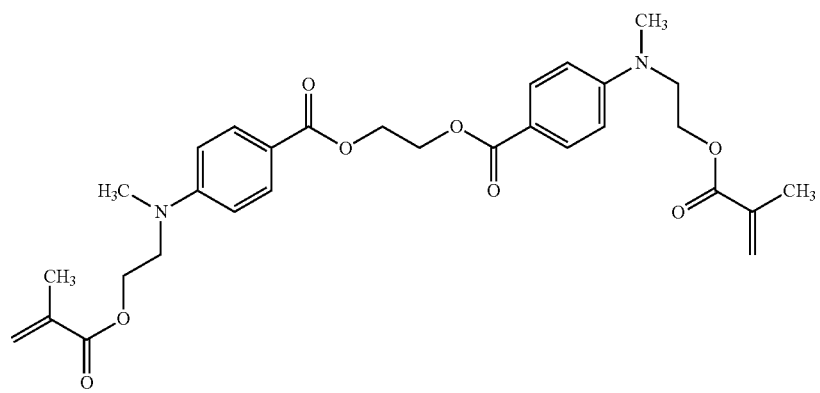 [SMILES: C=C(C)C(=O)OCCN(C)c1ccc(C(=O)OCCOC(=O)c2ccc(N(C)CCOC(=O)C(=C)C)cc2)cc1]
COINI-13
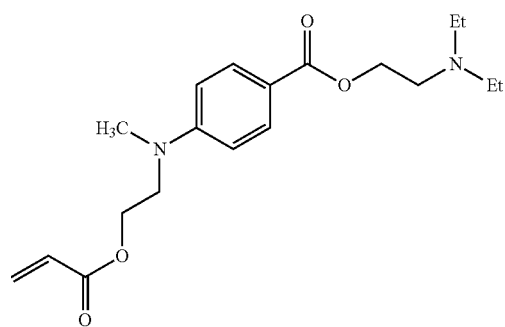 [SMILES: C=CC(=O)OCCN(C)c1ccc(C(=O)OCCN(CC)CC)cc1]

TABLE 5-continued
COINI-14
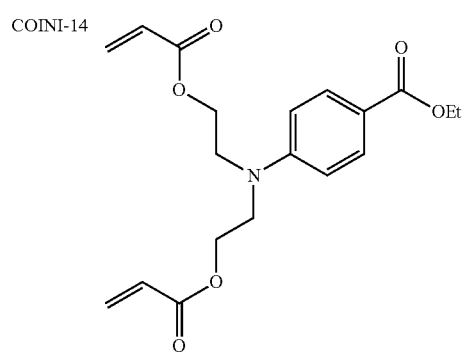
COINI-15
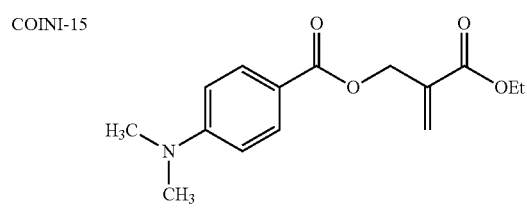
COINI-16
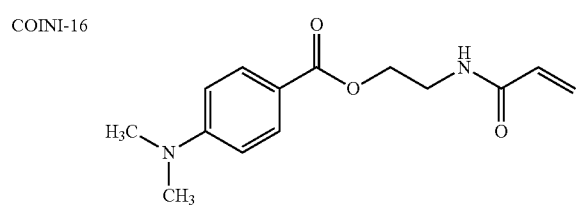
COINI-17
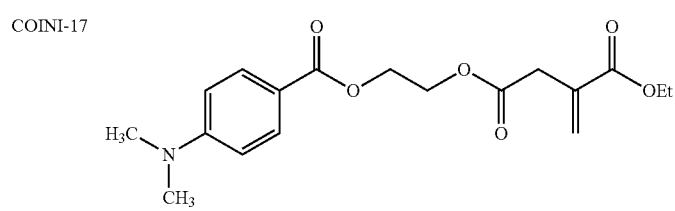
COINI-18
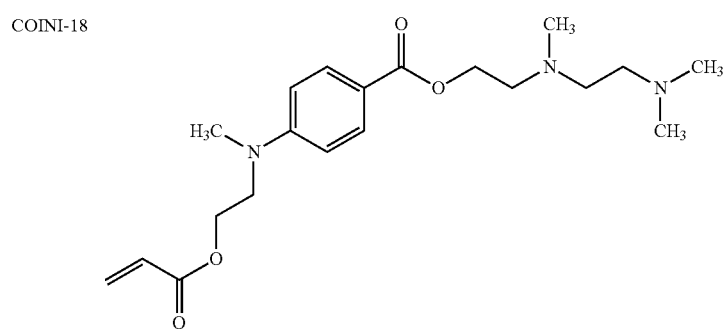
COINI-19
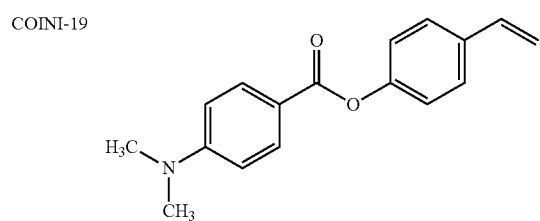

TABLE 5-continued

COINI-20

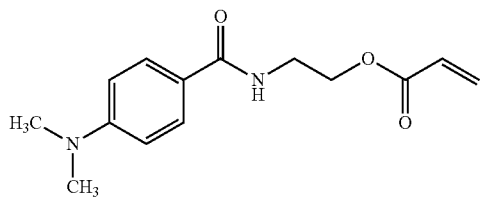 [SMILES: C=CC(=O)OCCNC(=O)c1ccc(N(C)C)cc1]

COINI-21

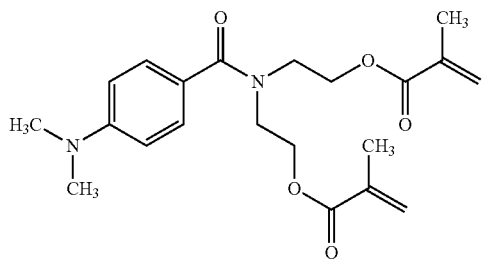 [SMILES: C=C(C)C(=O)OCCN(CCOC(=O)C(=C)C)C(=O)c1ccc(N(C)C)cc1]

The radiation curable compositions and inkjet ink include the polymerizable co-initiator preferably in an amount of 0.1 to 50 wt %, more preferably in an amount of 0.5 to 25 wt %, most preferably in an amount of 1 to 10 wt % of the total weight of the radiation curable composition or inkjet ink.

Colorants

The colorant is preferably a pigment or a polymeric dye. In food packaging applications, low molecular weight dyes, e.g. smaller than 1000 Dalton, can still migrate into the food or be extracted by the food giving undesired coloration of the food, or even worse allergic reactions after consuming the solid or liquid food. Most preferably the colorant is a pigment.

The pigments may be black, white, cyan, magenta, yellow, red, orange, violet, blue, green, brown, mixtures thereof, and the like. This colour pigment may be chosen from those disclosed by HERBST, Willy, et al. Industrial Organic Pigments, Production, Properties, Applications. 3rd edition. Wiley-VCH, 2004. ISBN 3527305769.

Particular preferred pigments are C.I. Pigment Yellow 1, 3, 10, 12, 13, 14, 17, 55, 65, 73, 74, 75, 83, 93, 97, 109, 111, 120, 128, 138, 139, 150, 151, 154, 155, 175, 180, 181, 185, 194 and 213.

Particular preferred pigments are C.I. Pigment Red 17, 22, 23, 41, 48:1, 48:2, 49:1, 49:2, 52:1, 57:1, 81:1, 81:3, 88, 112, 122, 144, 146, 149, 169, 170, 175, 176, 184, 185, 188, 202, 206, 207, 210, 216, 221, 248, 251, 254, 255, 264, 266, 270 and 272.

Particular preferred pigments are C.I. Pigment Violet 1, 2, 19, 23, 32, 37 and 39.

Particular preferred pigments are C.I. Pigment Blue 15:1, 15:2, 15:3, 15:4, 15:6, 16, 56, 61 and (bridged) aluminium phthalocyanine pigments.

Particular preferred pigments are C.I. Pigment Orange 5, 13, 16, 34, 40, 43, 59, 66, 67, 69, 71 and 73.

Particular preferred pigments are C.I. Pigment Green 7 and 36.

Particular preferred pigments are C.I. Pigment Brown 6 and 7.

Suitable pigments include mixed crystals of the above particular preferred pigments. A commercially available example is Cinquasia Magenta RT-355-D from Ciba Specialty Chemicals.

Carbon black is preferred as a black pigment. Suitable black pigments include carbon blacks such as Pigment Black 7 (e.g. Carbon Black MA8® from MITSUBISHI CHEMICAL), REGAL® 400R, MOGUL® L, ELFTEX® 320 from CABOT Co., or Carbon Black FW18, Special Black 250, Special Black 350, Special Black 550, PRINTER® 25, PRINTEX® 35, PRINTEX® 55, PRINTEX® 90, PRINTEX® 150T from DEGUSSA. Additional examples of suitable pigments are disclosed in U.S. Pat. No. 5,389,133 (XEROX).

It is also possible to make mixtures of pigments. For example, for some inkjet ink applications, a neutral black inkjet ink is preferred and can be obtained e.g. by mixing a black pigment and a cyan pigment into the ink. Also pigments may be combined to enlarge the colour gamut of an ink set. The inkjet application may also require one or more spot colours. Silver and gold are often desired colours for making a product more attractive by giving it an exclusive appearance.

Also non-organic pigments may be present in the inks. Suitable pigments are C.I. Pigment Metal 1, 2 and 3. Illustrative examples of the inorganic pigments include titanium oxide, barium sulphate, calcium carbonate, zinc oxide, lead sulphate, yellow lead, zinc yellow, red iron oxide (III), cadmium red, ultramarine blue, Prussian blue, chromium oxide green, cobalt green, amber, titanium black and synthetic iron black. However, care should be taken to prevent migration and extraction of heavy metals in food application. In the preferred embodiment no pigments are used which contain a heavy metal selected from the group consisting of arsenic, lead, mercury and cadmium.

Generally pigments are stabilized in the dispersion medium by dispersing agents, such as polymeric dispersants or surfactants. However, the surface of the pigments can be modified to obtain so-called "self-dispersible" or "self-dispersing" pigments, i.e. pigments that are dispersible in the dispersion medium without dispersants.

Pigment particles in inkjet ink should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 µm, more preferably between 0.070 and 0.300 µm and particularly preferably between 0.080 and 0.200 µm. Most preferably, the numeric average pigment particle size is no larger than 0.150 µm. However, the average pigment particle size for white inkjet inks including, for example, a titanium dioxide pigment, is preferably between 0.100 and 0.300 μm. An average particle size smaller than 0.050 μm is less desirable for decreased light-fastness, but mainly also because very small pigment particles or individual pigment molecules thereof may still be extracted in food packaging applications.

The pigment is preferably used in a pigment dispersion used for preparing the inkjet inks in an amount of 10 to 40 wt %, more preferably of 15 to 30 wt % based on the total weight of the pigment dispersion. In an radiation curable inkjet ink the pigment is preferably present in an amount of 0.1 to 20 wt %, preferably 1 to 10 wt % based on the total weight of the inkjet ink.

Dispersants

The dispersant is preferably a polymeric dispersant. Typical polymeric dispersants are copolymers of two monomers but may contain three, four, five or even more monomers. The properties of polymeric dispersants depend on both the nature of the monomers and their distribution in the polymer. Suitable copolymeric dispersants have the following polymer compositions:
- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Polymeric dispersants may have different polymer architecture including linear, comb/branched, star, dendritic (including dendrimers and hyperbranched polymers). A general review on the architecture of polymers is given by ODIAN, George, Principles of Polymerization, 4th edition, Wiley-Interscience, 2004, p. 1-18.

Comb/branched polymers have side branches of linked monomer molecules protruding from various central branch points along the main polymer chain (at least 3 branch points).

Star polymers are branched polymers in which three or more either similar or different linear homopolymers or copolymers are linked together to a single core.

Dendritic polymers include the classes of dendrimers and hyperbranched polymers. In dendrimers, with well-defined mono-disperse structures, all branch points are used (multistep synthesis), while hyperbranched polymers have a plurality of branch points and multifunctional branches that lead to further branching with polymer growth (one-step polymerization process).

Suitable polymeric dispersants may be prepared via addition or condensation type polymerizations. Polymerization methods include those described by ODIAN, George, Principles of Polymerization, 4th edition, Wiley-Interscience, 2004, p. 39-606.

Addition polymerization methods include free radical polymerization (FRP) and controlled polymerization techniques. Suitable controlled radical polymerization methods include:
RAFT: reversible addition-fragmentation chain transfer;
ATRP: atom transfer radical polymerization
MADIX: reversible addition-fragmentation chain transfer process, using a transfer active xanthate;
Catalytic chain transfer (e.g. using cobalt complexes);
Nitroxide (e.g. TEMPO) mediated polymerizations;
Other suitable controlled polymerization methods include:
GTP: group transfer polymerization;
Living cationic (ring-opening) polymerizations;
Anionic co-ordination insertion ring-opening polymerization; and
Living anionic (ring-opening) polymerization.

Reversible addition-fragmentation transfer (RAFT): controlled polymerization occurs via rapid chain transfer between growing polymer radicals and dormant polymer chains. A review article on RAFT synthesis of dispersants with different polymeric geometry is given in QUINN J. F. et al., Facile Synthesis of comb, star, and graft polymers via reversible addition-fragmentation chain transfer (RAFT) polymerization, Journal of Polymer Science, Part A: Polymer Chemistry, Vol. 40, 2956-2966, 2002.

Group transfer polymerization (GTP): the method of GTP used for synthesis of AB block copolymers is disclosed by SPINELLI, Harry J, GTP and its use in water based pigment dispersants and emulsion stabilisers, Proc. of 20th Int. Conf. Org. Coat. Sci. Technol., New Platz, N.Y., State Univ. N.Y., Inst. Mater. Sci. p. 511-518.

The synthesis of dendritic polymers is described in the literature. The synthesis of dendrimers in NEWCOME, G. R., et al. Dendritic Molecules: Concepts, Synthesis, Perspectives. VCH: WEINHEIM, 2001. Hyperbranching polymerization is described by BURCHARD, W. Solution properties of branched macromolecules. *Advances in Polymer Science.* 1999, vol. 143, no. II, p. 113-194. Hyperbranched materials can be obtained by polyfunctional polycondensation as disclosed by FLORY, P. J. Molecular size distribution in three-dimensional polymers. VI. Branched polymer containing A-R-Bf-1-type units. *Journal of the American Chemical Society.* 1952, vol. 74, p. 2718-1723.

Living cationic polymerizations is e.g. used for the synthesis of polyvinyl ethers as disclosed in WO 2005/012444 (CANON), US 20050197424 (CANON) and US 20050176846 (CANON). Anionic co-ordination ring-opening polymerization is e.g. used for the synthesis of polyesters based on lactones. Living anionic ring-opening polymerization is e.g. used for the synthesis of polyethylene oxide macromonomers.

Free radical Polymerization (FRP) proceeds via a chain mechanism, which basically consists of four different types of reactions involving free radicals: (1) radical generation from non-radical species (initiation), (2) radical addition to a substituted alkene (propagation), (3) atom transfer and atom abstraction reactions (chain transfer and termination by disproportionation), and (4) radical-radical recombination reactions (termination by combination).

Polymeric dispersants having several of the above polymer compositions are disclosed in U.S. Pat. No. 6,022,908 (HP), U.S. Pat. No. 5,302,197 (DU PONT) and U.S. Pat. No. 6,528,557 (XEROX).

Suitable statistical copolymeric dispersants are disclosed in U.S. Pat. No. 5,648,405 (DU PONT), U.S. Pat. No. 6,245,832 (FUJI XEROX), U.S. Pat. No. 6,262,207 (3M), US 20050004262 (KAO) and U.S. Pat. No. 6,852,777 (KAO).

Suitable alternating copolymeric dispersants are described in US 20030017271 (AKZO NOBEL).

Suitable block copolymeric dispersants have been described in numerous patents, especially block copolymeric dispersants containing hydrophobic and hydrophilic blocks. For example, U.S. Pat. No. 5,859,113 (DU PONT) discloses AB block copolymers and U.S. Pat. No. 6,413,306 (DU PONT) discloses ABC block copolymers.

Suitable graft copolymeric dispersants are described in CA 2157361 (DU PONT) (hydrophobic polymeric backbone and hydrophilic side chains); other graft copolymeric dispersants are disclosed in U.S. Pat. No. 6,652,634 (LEXMARK), U.S. Pat. No. 6,521,715 (DU PONT).

Suitable branched copolymeric dispersants are described U.S. Pat. No. 6,005,023 (DU PONT), U.S. Pat. No. 6,031,019 (KAO), U.S. Pat. No. 6,127,453 (KODAK).

Suitable dendritic copolymeric dispersants are described in e.g. U.S. Pat. No. 6,518,370 (3M), U.S. Pat. No. 6,258,896 (3M), US 2004102541 (LEXMARK), U.S. Pat. No. 6,649,138 (QUANTUM DOT), US 2002256230 (BASF), EP 1351759 A (EFKA ADDITIVES) and EP 1295919 A (KODAK).

Suitable designs of polymeric dispersants for inkjet inks are disclosed in SPINELLI, Harry J., Polymeric Dispersants in Inkjet technology, *Advanced Materials*, 1998, Vol. 10, no. 15, p. 1215-1218.

The monomers and/or oligomers used to prepare the polymeric dispersant can be any monomer and/or oligomer found in the Polymer Handbook Vol. 1+2, 4th edition, edited by J. BRANDRUP et al., Wiley-Interscience, 1999.

Polymers useful as pigment dispersants include naturally occurring polymers, and specific examples thereof include: proteins, such as glue, gelatine, casein, and albumin; naturally occurring rubbers, such as gum arabic and tragacanth; glucosides such as saponin; alginic acid and alginic acid derivatives, such as propylene glycol alginate; and cellulose derivatives, such as methyl cellulose, carboxymethyl cellulose and ethylhydroxy cellulose; wool and silk, and synthetic polymers.

Suitable examples of monomers for synthesizing polymeric dispersants include: acrylic acid, methacrylic acid, maleic acid (or there salts), maleic anhydride, alkyl(meth)acrylates (linear, branched and cycloalkyl) such as methyl (meth)acrylate, n-butyl(meth)acrylate, tert-butyl(meth)acrylate, cyclohexyl(meth)acrylate, and 2-ethylhexyl(meth)acrylate; aryl(meth)acrylates such as benzyl(meth)acrylate, and phenyl(meth)acrylate; hydroxyalkyl(meth)acrylates such as hydroxyethyl(meth)acrylate, and hydroxypropyl (meth)acrylate; (meth)acrylates with other types of functionalities (e.g. oxiranes, amino, fluoro, polyethylene oxide, phosphate substituted) such as glycidyl(meth)acrylate, dimethylaminoethyl(meth)acrylate, trifluoroethyl acrylate, methoxypolyethyleneglycol(meth)acrylate, and tripropyleneglycol(meth)acrylate phosphate; allyl derivatives such as allyl glycidyl ether; styrenics such as styrene, 4-methylstyrene, 4-hydroxystyrene, 4-acetostyrene, and styrene sulfonic acid; (meth)acrylonitrile; (meth)acrylamides (including N-mono and N,N-disubstituted) such as N-benzyl(meth) acrylamide; maleimides such as N-phenyl maleimide; vinyl derivatives such as vinylcaprolactam, vinylpyrrolidone, vinylimidazole, vinylnapthalene, and vinyl halides; vinylethers such as vinylmethyl ether; vinylesters of carboxylic acids such as vinylacetate, vinylbutyrate, and vinyl benzoate.

Suitable condensation type polymers include polyurethanes, polyamides, polycarbonates, polyethers, polyureas, polyimines, polyimides, polyketones, polyesters, polysiloxanes, phenol-formaldehydes, urea-formaldehydes, melamine-formaldehydes, polysulfides, polyacetals or combinations thereof.

Suitable copolymeric dispersants are acrylic acid/acrylonitrile copolymers, vinyl acetate/acrylic ester copolymers, acrylic acid/acrylic ester copolymers, styrene/acrylic acid copolymers, styrene/methacrylic acid copolymers, styrene/methacrylic acid/acrylic ester copolymers, styrene/α-methylstyrene/acrylic acid copolymers, styrene/α-methylstyrene/acrylic acid/acrylic ester copolymers, styrene/maleic acid copolymers, styrene/maleic anhydride copolymers, vinylnaphthalene/acrylic acid copolymers, vinylnapthalene/maleic acid copolymers, vinyl acetate/ethylene copolymers, vinyl acetate/fatty acid/ethylene copolymers, vinyl acetate/maleic ester copolymers, vinyl acetate/crotonic acid copolymers and vinyl acetate/acrylic acid copolymers.

Suitable chemistries of copolymeric dispersants also include:

Copolymers which are the product of a condensation process of poly(ethylene imine) with a carboxylic acid terminated polyester (made by addition polymerization); and Copolymers which are the product of a reaction of a multifunctional isocyanate with:
a compound monosubstituted with a group that is capable of reacting with an isocyanate, e.g. polyester;
a compound containing two groups capable of reacting with an isocyanate (cross-linker); and/or
a compound with at least one basic ring nitrogen and a group that is capable of reacting with an isocyanate group.

A detailed list of suitable polymeric dispersants is disclosed by MC CUTCHEON, Functional Materials, North American Edition, Glen Rock, N.J.: Manufacturing Confectioner Publishing Co., 1990, p. 110-129.

Suitable pigment stabilisers are also disclosed in DE 19636382 (BAYER), U.S. Pat. No. 5,720,802 (XEROX), U.S. Pat. No. 5,713,993 (DU PONT), WO 96/12772 (XAAR) and U.S. Pat. No. 5,085,689 (BASF).

One polymeric dispersant or a mixture of two or more polymeric dispersants may be present to improve the dispersion stability further. Sometimes surfactants can also be used as pigment dispersants, thus a combination of a polymeric dispersant with a surfactant is also possible.

The polymeric dispersant can be non-ionic, anionic or cationic in nature; salts of the ionic dispersants can also be used.

The polymeric dispersant has preferably a polymerization degree DP between 5 and 1,000, more preferably between 10 and 500 and most preferably between 10 and 100.

The polymeric dispersant has preferably a number average molecular weight Mn between 500 and 30,000, more preferably between 1,500 and 10,000.

The polymeric dispersant has preferably a weight average molecular weight Mw smaller than 100,000, more preferably smaller than 50,000 and most preferably smaller than 30,000.

The polymeric dispersant has preferably a polymeric dispersity PD smaller than 2, more preferably smaller than 1.75 and most preferably smaller than 1.5.

Commercial examples of polymeric dispersants are the following:
DISPERBYK™ dispersants available from BYK CHEMIE GMBH;
SOLSPERSE™ dispersants available from NOVEON;
TEGO™ DISPERS dispersants from DEGUSSA;
EDAPLAN™ dispersants from MUNZING CHEMIE;
ETHACRYL™ dispersants from LYONDELL;
GANEX™ dispersants from ISP;
DISPEX™ and EFKA™ dispersants from CIBA SPECIALTY CHEMICALS INC;
DISPONER™ dispersants from DEUCHEM; and
JONCRYL™ dispersants from JOHNSON POLYMER.

Particularly preferred polymeric dispersants include SOLSPERSE™ dispersants from NOVEON, EFKA™ dispersants from CIBA SPECIALTY CHEMICALS INC and DISPERBYK™ dispersants from BYK CHEMIE GMBH.

Particularly preferred dispersants for UV-curable pigmented dispersions are SOLSPERSE™ 32000, 35000 and 39000 dispersants from NOVEON.

The polymeric dispersant is preferably used in an amount of 2 to 600 wt %, more preferably 5 to 200 wt % based on the weight of the pigment.

Dispersion Synergists

The dispersion synergist usually consists of an anionic part and a cationic part. The anionic part of the dispersion synergist exhibiting a certain molecular similarity with the colour pigment and the cationic part of the dispersion synergist consists of one or more protons and/or cations to compensate the charge of the anionic part of the dispersion synergist.

The synergist is preferably added in a smaller amount than the polymeric dispersant(s). The ratio of polymeric dispersant/dispersion synergist depends upon the pigment and should be determined experimentally. Typically the ratio wt % polymeric dispersant/wt % dispersion synergist is selected between 2:1 to 100:1, preferably between 2:1 and 20:1.

Suitable dispersion synergists that are commercially available include SOLSPERSE™ 5000 and SOLSPERSE™ 22000 from NOVEON.

Particular preferred pigments for the magenta ink used are a diketopyrrolo-pyrrole pigment or a quinacridone pigment. Suitable dispersion synergists include those disclosed in pending European Patent Applications EP05111360 and EP05111358.

In dispersing C.I. Pigment Blue 15:3, the use of a sulfonated Cu-phthalocyanine dispersion synergist, e.g. SOLSPERSE™ 5000 from NOVEON is preferred. Suitable dispersion synergists for yellow inkjet inks include those disclosed in pending European Patent Application EP05111357.

Inhibitors

The first radiation curable composition and curable inkjet inks may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, SUMILIZER™ GA-80, SUMILIZER™ GM and SUMILIZER™ GS produced by Sumitomo Chemical Co. Ltd.; GENORAD™ 16, GENORAD™ 18 and GENORAD™ 20 from Rahn AG; IRGASTAB™ UV10 and IRGASTAB™ UV22, TINUVIN™ 460 and CGS20 from Ciba Specialty Chemicals; FLOORSTAB™ UV range (UV-1, UV-2, UV-5 and UV-8) from Kromachem Ltd, ADDITOL™ S range (S100, S110, S120 and S130) from Cytec Surface Specialties.

However, most preferably the inhibitor is a polymerizable inhibitor.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total ink.

Surfactants

The first radiation curable composition and curable inkjet inks may contain at least one surfactant. The surfactant can be anionic, cationic, non-ionic, or zwitter-ionic and is usually added in a total quantity less than 20 wt % based on the total weight of the inkjet ink and particularly in a total less than 10 wt % based on the total weight of the inkjet ink. A combination of surfactants may be used.

The surfactant is preferably a fluorinated or silicone compound, preferably a cross-linkable or polymerizable surfactant is used. Polymerizable monomers having surface-active effects include silicone modified acrylates, silicone modified methacrylates, acrylated siloxanes, polyether modified acrylic modified siloxanes, fluorinated acrylates, and fluorinated methacrylates. Polymerizable monomers having surface-active effects can be mono-, di-, tri- or higher functional (meth)acrylates or mixtures thereof.

Preparation of Radiation Curable Compositions

The average particle size and distribution is an important feature for inkjet inks. The inkjet ink may be prepared by precipitating or milling the pigment in the dispersion medium in the presence of the dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can include particles, preferably substantially spherical in shape, e.g. beads consisting essentially of a polymeric resin or yttrium stabilized zirconium oxide beads.

In the process of mixing, milling and dispersion, each process is performed with cooling to prevent build up of heat, and as much as possible under light conditions in which actinic radiation has been substantially excluded.

The inkjet ink may contain more than one pigment, and may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture include the mill grind and the milling media. The mill grind includes pigment, polymeric dispersant and a liquid carrier. For inkjet inks, the pigment is usually present in the mill grind at 1 to 50 wt %, excluding the milling media. The weight ratio of pigment over polymeric dispersant is 20:1 to 1:2.

The milling time can vary widely and depends upon the pigment, mechanical means and residence conditions selected, the initial and desired final particle size, etc. In a preferred embodiment of the present invention, pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general it is desirable to make the inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, colour, hue, saturation density, and print area coverage for the particular application.

EXAMPLES

Materials

All materials used in the following examples were readily available from standard sources such as Aldrich Chemical Co. (Belgium) and Acros (Belgium) unless otherwise specified. The water used was deionized water.

RT-355-D is an abbreviation used for CINQUASIA™ Magenta RT-355-D, a quinacridone pigment from CIBA SPECIALTY CHEMICALS.

PY150 is an abbreviation used for CHROMOPHTAL™ Yellow LA2, a C.I. Pigment Yellow 150 from CIBA SPECIALTY CHEMICALS. PB15:4 is an abbreviation used for HOSTAPERM™ Blue P-BFS, a C.I. Pigment Blue 15:4 pigment from CLARIANT.

S35000 is an abbreviation for SOLSPERSE™ 35000, a polyethyleneimine-polyester hyperdispersant from NOVEON. S39000 is an abbreviation for SOLSPERSE™ 39000, a polyethyleneimine-polyester hyperdispersant from NOVEON. TEGO™ Dispers 681 UV is a dispersant available from DEGUSSA.

S1 is BARLO™ XT polymethylmethacrylate substrate from BARLO.
S2 is Biprint blanc/couleur 650 gr, a corona treated, polypropylene board available from ANTALIS.
S3 is PRIPLAK™ Classic an antistatic and corona treated polypropylene substrate from PRIPLAK.

BYK™ UV3510 is a polyethermodified polydimethylsiloxane wetting agent from BYK CHEMIE GMBH. BYK™-333 is a surfactant from BYK CHEMIE GMBH. BYK333SOL is a 1% by weight solution of BYK™-333 in VEEA. BYK333SOL2 is a 1% by weight solution of BYK™-333 in DPGDA. SILWET™ L7602 is a polyalkyene oxide modified dimethyl polysiloxane surfactant from OSI SPECIALITIES BENELUX NV.

GENORAD™ 16 is a polymerization inhibitor from RAHN AG.
GENOCURE™ EPD is ethyl 4-dimethylaminobenzoate from RAHN AG. DAROCUR™ ITX is 2-isopropyl isothioxanthone, a photo-initiator available from CIBA SPECIALTY CHEMICALS.
DAROCUR™ TPO is 2,4,6-trimethylbenzoyl-diphenyl-phosphineoxide, a photoinitiator available from CIBA SPECIALTY CHEMICALS.
IRGACURE™ 127 is 2-Hydroxy-1-{4-[4-(2-hydroxy-2-methyl-propionyl)-benzyl]-phenyl}-2-methyl-propan-1-one, a photo-initiator available from CIBA SPECIALTY CHEMICALS.
R GEN 1130 is bis(p-tolyl)iodonium hexafluorophosphate, a photo-initiator available from CHITEC, Taiwan.
CAT 006 is a cycloaliphatic epoxy resin available from CYTEC Surface Specialties, now sold as UVACURE™ 1503.

DPGDA is dipropyleneglycoldiacrylate available under the trade name of SARTOMER™ SR508 from SARTOMER. SR399™ LV is a low viscosity dipentaerythritol pentaacrylate from SARTOMER.
SR272™ is triethylene glycol diacrylate from SARTOMER. VEEA is 2-(vinylethoxy)ethyl acrylate, a difunctional monomer available from NIPPON SHOKUBAI, Japan.
DEGDVE is diethylene glycol divinylether available from BASF.

Measurement Methods
1. Viscosity
The viscosity of the inkjet inks was measured using a Brookfield DV-II+viscometer at 25° C. and shear rate of 4 RPM.
2. Average Particle Size of Concentrated Pigment Dispersion (Malvern)
The average particle size of pigment particles in concentrated pigment dispersions was determined by photon correlation spectroscopy at a wavelength of 633 nm with a 4 mW HeNe laser on a diluted sample of the pigmented inkjet ink. The particle size analyzer used was a MALVERN™ nano-S available from Goffin-Meyvis.

The sample was prepared by addition of one drop of ink to a cuvet containing 1.5 mL water and mixed until a homogenous sample was obtained. The measured particle size is the average value of 3 consecutive measurements consisting of 6 runs of 20 seconds. For good ink jet characteristics (jetting characteristics and print quality) the average particle size of the dispersed particles is preferably below 150 nm.
3. Adhesion
De adhesion is evaluated by a cross-cut test according to ISO2409:1992(E). Paints. International standard. Aug. 15, 1992. using a Braive No. 1536 Cross Cut Tester from BRAIVE INSTRUMENTS with spacing of a 1 mm between cuts and using a weight of 600 g, in combination with a TESATAPE™ 4104 PVC tape.

The evaluation was made in accordance with the classification described below.
Classification:
0=The edges of the cuts are completely smooth: none of the squares of the lattice is detached (=perfect adhesion).
1=Detachment of small flakes of the coating at the intersections of the cuts. A cross-cut area not greater than 5% is affected.
2=The coating has flaked along the edges and/or at the intersections of the cuts. A cross-cut area greater than 5%, but not significantly greater than 15%, is affected.
3=The coating has flaked along the edges of the cuts partly or wholly in large ribbons, and/or it has flaked partly or wholly on different parts of the squares. A cross-cut area significantly greater than 15%, but not significantly greater than 35%, is affected.
4=The coating has flaked along the edges of the cuts in large ribbons, and/or some of the squares has detached partly or wholly. A cross-cut area significantly greater than 35%, but not significantly greater than 65%, is affected.
5=Any degree of flaking that cannot even be classified by classification 4
4. Surface Tension
The surface tension of the inkjet inks was measured with a KRÜSS tensiometer K9 at 25° C. after 60 seconds.

Example 1

This example illustrates how a cationic primer with a cationically polymerizable compound having an acrylate group can be advantageously used for improving the adhesion of free radical polymerizable inks on difficult substrates for free radical polymerizable inks such as e.g. a polypropylene substrate.
Preparation of Free Radical Polymerizable Magenta Inkjet Inks MR1 and MR2
A concentrated pigment dispersion CMR1 was made by mixing 533.3 g of a 30 wt % solution of the polymeric dispersant in SOLSPERSE™ 39000 in VEEA, 16.0 g of a 50% solution in VEEA of the stabilizer GENORAD™ 16 and 160.0 g of RT355D for 40 minutes using a DISPERLUX™ YELLOW075 (from DISPERLUX S.A.R.L., Luxembourg) and subsequently milling this mixture in a Eiger Lab Bead mill (from EIGER TORRANCE Ltd.) using yttrium-stabilized zirconium oxide-beads of 0.4 mm diameter ("high wear resistant zirconia grinding media" from TOSOH Co.). The bead mill is filled for 52% with the grinding beads and water-cooled during milling at 4250 rpm for 280 minutes. After milling the dispersion was separated from the beads using a filter cloth. The concentrated pigment dispersion CMR1 had an average particles size of 104 nm measured with a MALVERN™ nano-S particle size analyzer.

A concentrated pigment dispersion CMR2 was made by mixing 86.3 g of DPGDA' 466.7 g of a 30 wt % solution of the polymeric dispersant in SOLSPERSE™ 35000 in DPGDA, 7.0 g of GENORAD™ 16 and 140 g of Cinquasia MAGENTA™ RT355D for 25 minutes using a DISPERLUX™ YELLOW075 (from DISPERLUX S.A.R.L., Luxembourg) and subsequently milling this mixture in a Eiger Lab Bead mill (from EIGER TORRANCE Ltd.) using yttrium-stabilized zirconium oxide-beads of 0.4 mm diameter ("high wear resistant zirconia grinding media" from TOSOH Co.). The bead mill is filled for 50% with the grinding beads and water-cooled during milling at 4250 rpm for 300 minutes. After milling the dispersion was separated from the beads using a filter cloth. The concentrated pigment dispersion CMR2 had an average particles size of 115 nm measured with a MALVERN™ nano-S particle size analyzer.

The curable magenta inkjet inks MR1 and MR2 were both prepared in the same manner from the concentrated pigment dispersion CMR1 respectively CMR2 by adding the remaining components under stirring to obtain a composition as shown in Table 6.

TABLE 6

| wt % of | MR1 | MR2 |
| --- | --- | --- |
| RT355D | 3.50 | 3.50 |
| S35000 | — | 3.50 |
| S39000 | 3.50 | — |
| VEEA | 70.29 | — |
| SR399 ™ LV | 20.00 | — |
| DPGDA | — | 76.95 |
| GENOCURE ™ EPD | — | 5.00 |
| IRGACURE ™ 127 | 2.50 | — |
| DAROCUR ™ ITX | — | 5.00 |
| DAROCUR ™ TPO | — | 4.95 |
| GENORAD ™ 16 | 0.18 | 1.00 |
| BYK ™ 333 | 0.03 | — |
| BYK ™ 3510 | — | 0.10 |

The magenta inkjet ink MR1 contains VEEA as a cationically polymerizable compound having at least one (meth) acrylate group, which can be advantageously used to lower the viscosity of an ink. The viscosity of the inkjet inks MR1 and MR2 was 17 mPa·s and 23 mPa·s respectively.

Preparation of Primers

Three cationically polymerizable primers PC1 to PC3 and one free radical polymerizable primer PR1 were prepared according to Table 7. In the primers PC2 and PC3 the cationically polymerizable compound having at least one (meth) acrylate group, VEEA, was replaced by a combination of a dinvinylether and a diacrylate.

TABLE 7

| wt % of | PC1 | PC2 | PC3 | PR1 |
| --- | --- | --- | --- | --- |
| VEEA | 50.00 | — | — | 76.50 |
| SR272 ™ | — | 15.00 | 25.00 | — |
| DEGDVE | — | 35.00 | 25.00 | — |
| SR399 ™ LV | — | — | — | 20.00 |
| R GEN 1130 | 4.00 | 4.00 | 4.00 | — |
| UVACURE ™ 1503 | 44.90 | 44.90 | 44.90 | — |
| DAROCUR ™ ITX | 1.00 | 1.00 | 1.00 | — |
| IRGACURE ™ 127 | — | — | — | 2.50 |
| SILWET L7602 | 0.10 | 0.10 | 0.10 | — |
| BYK333SOL | — | — | — | 1.00 |

The primers were coated according to Table 9 on different substrates using a bar coater and a 10 μm wired bar. Each coated layer was cured using a Fusion DRSE-120 conveyer, equipped with a Fusion VPS/1600 lamp (D-bulb), which transported the samples under the UV lamp on a conveyer belt at a speed of 20 m/min.

VEEA can be advantageously used to have a low viscous primer, hence making it a jettable composition. The primers PC1 and PR1 both had a viscosity of about 8 mPa·s, while, for example, the primer PC3 had a viscosity of 15 mPa·s.

Evaluation of Inkjet Inks MR1 and MR2

The free radical polymerizable inkjet inks MR1 and MR2 were evaluated by coating them on different primed and unprimed substrates according to Table 9 using a bar coater and a 10 μm wired bar. Each coated ink layer was cured using a Fusion DRSE-120 conveyer, equipped with a Fusion VPS/1600 lamp (D-bulb), which transported the samples under the UV lamp on a conveyer belt at a speed of 20 m/min.

TABLE 8

| | | Substrate | | | |
| --- | --- | --- | --- | --- | --- |
| Sample | No. | Type | Primer | Ink | Adhesion |
| Comp-1 | S1 | PMMA | — | MR1 | 0 |
| Comp-2 | S1 | PMMA | PR1 | MR2 | 0 |
| Comp-3 | S2 | PP | — | MR1 | 3 |
| Comp-4 | S3 | PP | — | MR1 | 5 |
| INV-1 | S2 | PP | PC1 | MR1 | 0 |
| INV-2 | S3 | PP | PC1 | MR1 | 1 |
| Comp-5 | S2 | PP | PC2 | MR1 | 5 |
| Comp-6 | S2 | PP | PC3 | MR1 | 4 |
| Comp-7 | S2 | PP | — | MR2 | 5 |
| Comp-8 | S3 | PP | — | MR2 | 5 |
| INV-3 | S2 | PP | PC1 | MR2 | 0 |
| INV-4 | S3 | PP | PC1 | MR2 | 2 |

Table 9 shows that the free radical polymerizable inks MR1 and MR2 adhere well on a polymethylmethacrylate substrate, either directly in sample COMP-1 or through a free radical polymerizable primer PR1 in sample COMP-2. However, the same inks exhibit poor adhesion on a polypropylene substrate (see samples COMP-3, COMP-4, COMP-7 and COMP-8). The inventive samples INV-1 to INV-4 show that the use of a monomer including a vinyl ether group and an acrylate group, i.e. VEEA, in a cationically polymerizable primer PC1 delivered good adhesion results for both inks MR1 and MR2. The samples COMP-5 and COMP-6 show that poor adhesion was obtained by replacement of the difunctional monomer VEEA by a combination of a dinvinylether monomer and a diacrylate monomer.

In addition a test was performed on a sample similar to sample INV-1 but wherein the primer was not cured before but after jetting the inkjet ink MR1. In the latter case no good adhesion was observed.

Example 2

This example illustrates how a free radical polymerizable primer with a cationically polymerizable compound having an acrylate group can be advantageously used for improving the adhesion of cationically polymerizable inks on difficult substrates for cationically polymerizable inks such as e.g. polymethylmethacrylate substrate.

Preparation of a Cationically Polymerizable Magenta Inkjet Inks MC1

A concentrated pigment dispersion CMC1 was made by mixing 266.7 g of a 30 wt % solution of the polymeric dispersant in TEGO™ Dispers 681 UV in VEEA, 16.0 g of a 50% solution in VEEA of the stabilizer GENORAD™ 16 and 80 g of RT355D for 40 minutes using a DISPERLUX™ YELLOW075 (from DISPERLUX S.A.R.L., Luxembourg) and subsequently milling this mixture in a Eiger Lab Bead mill (from EIGER TORRANCE Ltd.) using yttrium-stabilized zirconium oxide-beads of 0.4 mm diameter ("high wear resistant zirconia grinding media" from TOSOH Co.). The bead mill is filled for 52% with the grinding beads and water-cooled during milling at 4250 rpm for 280 minutes. After milling the dispersion was separated from the beads using a filter cloth. The concentrated pigment dispersion CMC1 had an average particles size of 115 nm measured with a MALVERN™ nano-S particle size analyzer.

The curable magenta inkjet ink MC1 was prepared from the concentrated pigment dispersion CMC1 by adding the remaining components under stirring to obtain a composition as shown in Table 9.

TABLE 9

| wt % of | MC1 |
| --- | --- |
| Pigment dispersion CMC1 | 40.00 |
| VEEA | 18.40 |
| R GEN 1130 | 4.00 |
| UVACURE ™ 1503 | 36.50 |
| DAROCUR ™ ITX | 1.00 |
| SILWET L7602 | 0.10 |

The magenta inkjet ink MC1 contains VEEA as a cationically polymerizable compound having at least one (meth)acrylate group.

Preparation of Primers

Three free radical polymerizable primers PR1 to PR3 were prepared according to Table 10. The cationically polymerizable compound having at least one (meth)acrylate group, VEEA, in the primers PR2 and PR3 was replaced by a combination of a dinvinylether and a diacrylate.

TABLE 10

| wt % of | PR1 | PR2 | PR3 |
| --- | --- | --- | --- |
| VEEA | 76.50 | — | — |
| SR272 ™ | — | 15.00 | 25.00 |
| DEGDVE | — | 35.00 | 25.00 |
| SR399 ™ LV | 20.00 | 20.00 | 20.00 |
| IRGACURE ™ 127 | 2.50 | 2.50 | 2.50 |
| BYK333SOL | 1.00 | 1.00 | 1.00 |

The primers were then coated according to Table 11 on a PMMA substrate using a bar coater and a 10 μm wired bar. Each coated layer was cured using a Fusion DRSE-120 conveyer, equipped with a Fusion VPS/1600 lamp (D-bulb), which transported the samples under the UV lamp on a conveyer belt at a speed of 20 m/min.

Evaluation of Inkjet Ink MC1

The cationically polymerizable inkjet ink MC1 was evaluated by coating it on different primed and unprimed substrates according to Table 11 using a bar coater and a 10 μm wired bar. Each coated ink layer was cured using a Fusion DRSE-120 conveyer, equipped with a Fusion VPS/1600 lamp (D-bulb), which transported the samples under the UV lamp on a conveyer belt at a speed of 20 m/min.

TABLE 11

| Sample | Substrate No. | Substrate Type | Primer | Adhesion |
| --- | --- | --- | --- | --- |
| COMP-9 | S2 | PP | — | 0 |
| COMP-10 | S3 | PP | — | 0 |
| COMP-11 | S1 | PMMA | — | 5 |
| INV-5 | S1 | PMMA | PR1 | 0 |
| COMP-12 | S1 | PMMA | PR2 | 5 |
| COMP-13 | S1 | PMMA | PR3 | 5 |

From Table 11 it is clear in samples COMP-9 to COMP-11 that the inkjet ink MC1 adheres well to a polypropylene substrate, but not to a polymethylmethacrylate substrate. Only the free radical polymerizable primer PR1 which contains VEEA in a substantial amount is capable of improving the adhesion. The free radical polymerizable primers PR2 and PR3, although containing a small amount of VEEA via the addition of the surfactant BYK333SOL are incapable of improving the adhesion of the ink MC1 to a PMMA substrate.

Example 3

This example illustrates the applicability of the present invention in an inkjet inkset including a cationically polymerizable clear ink and three free radical polymerizable inks: a magenta ink (M), a cyan ink (c) and a yellow ink (Y).

The cationically polymerizable primer PC1 of EXAMPLE 1 was used as the colourless ink in the inkset. The curable colour inks were all prepared in the same manner as the ink MR2 of EXAMPLE 1 but now to obtain ink compositions according to Table 12.

TABLE 12

| in wt % of ink | M | C | Y |
| --- | --- | --- | --- |
| DPGDA | 76.95 | 77.95 | 78.55 |
| RT355D | 3.50 | — | — |
| PB15:4 | — | 3.00 | — |
| PY150 | — | — | 2.70 |
| S35000 | 3.50 | 3.00 | 2.70 |
| GENOCURE ™ EPD | 5.00 | 5.00 | 5.00 |
| DAROCUR ™ ITX | 5.00 | 5.00 | 5.00 |
| DAROCUR ™ TPO | 4.95 | 4.95 | 4.95 |
| BYK ™ UV 3510 | 0.10 | 0.10 | 0.10 |
| GENORAD ™ 16 | 1.00 | 1.00 | 1.00 |

The physical properties of the colour inkjet inks in the curable inkjet ink set are listed in Table 13.

TABLE 13

| Physical properties | M | C | Y | Dimension |
| --- | --- | --- | --- | --- |
| viscosity at 25° C. | 23 | 20 | 17 | mPa · s |
| viscosity at 45° C. | 11 | 9 | 9 | mPa · s |
| surface tension at 25° C. | 24.9 | 24.5 | 25.1 | mN/m |

Each of the inks of the ink set was evaluated on the unprimed polypropylene substrate S2 as used in sample COMP-3 and the polypropylene substrate S2 primed as prepared and used in sample INV-1 of EXAMPLE 1. The results are shown in Table 14.

TABLE 14

| Substrate | Primer | Adhesion for ink: | | |
|---|---|---|---|---|
| | | M | C | Y |
| S2 | — | 5 | 5 | 3 |
| S2 | PC1 | 0 | 1 | 1 |

From Table 14, it is clear that the three free radical curable inks only adhere to a polypropylene substrate when it has been primed with the cationically polymerizable primer PC1 containing a cationically polymerizable compound having an acrylate group.

Example 4

This example illustrates that the cationically polymerizable compound having an (meth)acrylate group should be present in the primer in a sufficient amount to improve the adhesion of inkjet inks.
Preparation of Primers
The free radical polymerizable primers PR4 to PR10 were prepared according to Table 15 by replacing the cationically polymerizable compound having at least one (meth)acrylate group, VEEA, in increasing amounts by DPGDA.

TABLE 15

| wt % of: | PR4 | PR5 | PR6 | PR7 | PR8 | PR9 | PR10 |
|---|---|---|---|---|---|---|---|
| VEEA | 74.5 | 60.0 | 50.0 | 40.0 | 30.0 | 20.0 | 10.0 |
| DPGDA | — | 14.5 | 24.5 | 34.5 | 44.5 | 54.5 | 64.5 |
| IRGACURE ™ 127 | 2.5 | 2.5 | 2.5 | 2.5 | 2.5 | 2.5 | 2.5 |
| SARTOMER ™ 399LV | 20.0 | 20.0 | 20.0 | 20.0 | 20.0 | 20.0 | 20.0 |
| BYK333SOL | 3.0 | — | — | — | — | — | — |
| BYK333SOL2 | — | 3.0 | 3.0 | 3.0 | 3.0 | 3.0 | 3.0 |

Evaluation
The free radical polymerizable primers PR4 to PR10 were coated on the substrate S1 using a bar coater and a 10 μm wired bar. Each coated layer was cured using a Fusion DRSE-120 conveyer, equipped with a Fusion VPS/1600 lamp (D-bulb), which transported the samples under the UV lamp on a conveyer belt at a speed of 20 m/min.
The adhesion of the primer to the substrate was tested in the same way as tested for an ink.
The same magenta ink MC1 as used in EXAMPLE 2 was coated on each of the prepared samples and each sample was tested for adhesion of the ink to the primed substrate. The results are shown in Table 16.

TABLE 16

| Sample | Primer | wt % VEEA | Adhesion of the primer | Adhesion of the ink MC1 |
|---|---|---|---|---|
| INV-6 | PR4 | 79 | 0 | 0 |
| INV-7 | PR5 | 63 | 0 | 0 |
| INV-8 | PR6 | 53 | 0 | 0 |
| INV-9 | PR7 | 42 | 0 | 0 |
| INV-10 | PR8 | 32 | 0 | 0 |

TABLE 16-continued

| Sample | Primer | wt % VEEA | Adhesion of the primer | Adhesion of the ink MC1 |
|---|---|---|---|---|
| COMP-14 | PR9 | 21 | 0 | 4 |
| COMP-15 | PR10 | 11 | 5 | 5 |

From Table 16, it is clear that the cationically polymerizable compound having an (meth)acrylate group, i.e. VEEA, should be present in amount of at least 25 wt % based upon the total curable composition of the inkjet ink in order to improve the adhesion of the ink MC1.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:
1. An inkjet ink set comprising:
a first radiation curable composition curable by cationic polymerization; and
a second radiation curable composition curable by free radical polymerization; wherein
the first radiation curable composition includes a cationically polymerizable compound including at least one (meth)acrylate group present in the first radiation curable composition in an amount of at least 25 wt % based upon a total weight of the first radiation curable composition but does not include an organic solvent.
2. The inkjet ink set according to claim 1, wherein the cationically polymerizable compound including the at least one (meth)acrylate group is a radiation curable monomer represented by Formula (I):

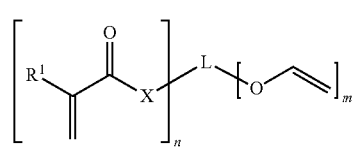

Formula (I)

wherein,
$R^1$ represents hydrogen, or a substituted or unsubstituted alkyl group;
L represents a linking group including at least one carbon atom;
X represents O, S, or $NR^2$ wherein $R^2$ has the same meaning as $R^1$; when $X=NR^2$, L and $R^2$ may form together a ring system; and
n and m independently represent a value from 1 to 5.
3. The inkjet ink set according to claim 1, wherein the first radiation curable composition is a colorless composition.
4. The inkjet ink set according to claim 1, wherein the first radiation curable composition includes titanium dioxide.
5. The inkjet ink set according to claim 1, wherein the second radiation curable composition is a radiation curable inkjet ink including a colorant.
6. The inkjet ink set according to claim 1, wherein the second radiation curable composition comprises one or more radiation curable inkjet inks curable by free radical polymerization.
7. The inkjet ink set according to claim 6, wherein the first radiation curable composition is a colorless cationically polymerizable inkjet ink, and the one or more radiation curable inkjet inks include at least one cyan free radical polymerizable inkjet ink, at least one magenta free radical polymerizable inkjet ink, at least one yellow free radical polymerizable inkjet ink, and at least one black free radical polymerizable inkjet ink.

8. The inkjet ink set according to claim 6, wherein the first radiation curable composition is a white cationically polymerizable inkjet ink, and the one or more radiation curable inkjet links include at least one cyan free radical polymerizable inkjet ink, at least one magenta free radical polymerizable inkjet ink, at least one yellow free radical polymerizable inkjet ink, and at least one black free radical polymerizable inkjet ink.

9. The inkjet ink set according to claim 1, wherein the first and second radiation curable compositions include a diffusion hindered photoinitiator selected from the group consisting of polymeric initiators and polymerizable initiators.

* * * * *